(12) United States Patent
Wallentin et al.

(10) Patent No.: US 11,470,518 B2
(45) Date of Patent: Oct. 11, 2022

(54) RELAYING BETWEEN A USER EQUIPMENT AND A NETWORK

(71) Applicant: Telefonaktiebolaget LM Ericsson (publ), Stockholm (SE)

(72) Inventors: Pontus Wallentin, Linköping (SE); Mats Folke, Vällingby (SE); Patrik Rugeland, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 167 days.

(21) Appl. No.: 16/335,699

(22) PCT Filed: Sep. 29, 2017

(86) PCT No.: PCT/SE2017/050957
§ 371 (c)(1),
(2) Date: Mar. 22, 2019

(87) PCT Pub. No.: WO2018/063081
PCT Pub. Date: Apr. 5, 2018

(65) Prior Publication Data
US 2019/0239132 A1    Aug. 1, 2019

Related U.S. Application Data

(60) Provisional application No. 62/402,207, filed on Sep. 30, 2016.

(51) Int. Cl.
*H04W 88/04* (2009.01)
*H04W 36/00* (2009.01)
(Continued)

(52) U.S. Cl.
CPC ....... *H04W 36/0069* (2018.08); *H04W 8/005* (2013.01); *H04W 36/165* (2013.01); *H04W 76/14* (2018.02); *H04W 88/04* (2013.01)

(58) Field of Classification Search
CPC ..... H04W 36/03; H04W 76/23; H04W 8/005; H04W 76/14; H04W 36/0085;
(Continued)

(56) References Cited

U.S. PATENT DOCUMENTS

2013/0244661 A1* 9/2013 Lin ................. H04W 76/14
455/436
2014/0078971 A1* 3/2014 Bontu .............. H04W 8/005
370/329

(Continued)

OTHER PUBLICATIONS

"Considerations on the evolved UE-to-Network Relay scenario and architecture", 3GPP TSG-RAN WG2 Meeting #95; R2-165254; Göteborg, Sweden, Aug. 22-26, 2016, pp. 1-5.
(Continued)

*Primary Examiner* — Quoc Thai N Vu
(74) *Attorney, Agent, or Firm* — Murphy, Bilak & Homiller, PLLC

(57) ABSTRACT

A radio access network comprises a first radio access node and a second radio access node. On determining that a first UE that is served by the first radio access node should start relaying through a second UE, it is determined whether the second UE is served by the first radio access node. In response to determining that the second UE is served not by the first radio access node but by the second radio access node, a handover is initiated, such that the first and second UEs are served by the same radio access node.

8 Claims, 33 Drawing Sheets

(51) Int. Cl.
*H04W 36/16* (2009.01)
*H04W 8/00* (2009.01)
*H04W 76/14* (2018.01)

(58) Field of Classification Search
CPC ............. H04W 36/0069; H04W 88/04; H04W 36/165; H04B 17/382
See application file for complete search history.

(56) References Cited

U.S. PATENT DOCUMENTS

2014/0342747 A1* 11/2014 Lee ................... H04W 76/14 455/450
2018/0092017 A1* 3/2018 Freda .................. H04W 76/23
2018/0109985 A1* 4/2018 Huang ............. H04W 36/0005
2018/0160287 A1* 6/2018 Wu ....................... H04W 8/005

OTHER PUBLICATIONS

"Mobility aspects of UE-to-Network Relaying", 3GPP TSG-RAN WG2 #91 bis; Tdoc R2-154155; Malmö, Sweden, Oct. 5-9, 2015, pp. 1-5.
"The remote UE access to relay UE served by one neighbor cell", 3GPP TSG-RAN WG2 Meeting#91 bis; R2-154308; Malmö, Sweden, Oct. 5-9, 2015, pp. 1-4.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.4.0, Jun. 2016, pp. 1-310.

* cited by examiner

RELAYING BETWEEN A USER EQUIPMENT AND A NETWORK

BACKGROUND

Proximity-based Services (ProSe) was developed by 3GPP in Rel-12 as a way to provide device-to-device (D2D) communication over the LTE, also known as LTE sidelink communications. One application for this is Public Safety. The ProSe UE-to-Network Relay was also developed for public safety applications, initially to extend connectivity to out-of-coverage (OoC) UEs in 3GPP rel-13. FIG. 1 shows a network configuration for use in Public Safety, in which a remote UE 101 connects through a ProSe UE-to-Network Relay 103 over the direct UE-to-UE interface, also known as the LTE sidelink. The relay 103 connects over the Uu interface to a radio access network node such as an eNodeB (eNB) 105, which is connected to the Extended Packet Core (EPC) 107. The applications, such as Mission Critical Push to Talk (MCPTT), are served by a Public Safety Application Server (AS) 109, which is connected to the EPC over a SGi interface.

The ProSe UE-to-Network Relay node 103 may for example be a UE with capabilities to serve as relay for remote UEs. FIG. 2 shows how relaying is initiated in a network such as that shown in FIG. 1, including a Mobility Management Entity (MME) 221, Serving Gateway (S-GW) 223 and Packet Gateway (P-GW) 225 as EPC network nodes. At step 201, the relay UE sets up a PDN connection to the core network (EPC) using the Attach procedure via the eNB. At step 202, the remote UE 101 and the relay UE 103 perform a discovery procedure (using either Model A or Model B) and at step 203 they establish a connection for one-to-one communication, so that they are able to use sidelink communication over PC5. At step 204, an IP address and prefix are allocated and, at step 205, the relay UE sends a report to the MME identifying the remote user and giving IP information, and the MME sends this report to the P-GW at step 206. Thereafter, the remote UE 101 is able to send relayed traffic through the relay UE to the packet gateway. Thus, for example, the remote UE may setup a PDN connection to the network while it is in E-UTRAN network coverage. When the remote UE leaves coverage, it may start searching (using the discovery process) for a relay UE and then connect to it over the sidelink, and via the relayed data still have connectivity with the Public Safety Application Server (AS), using the PDN connection of the relay UE.

FIG. 3 is a protocol stack diagram showing the protocols in use in the network of FIG. 1. As shown in FIG. 3, the ProSe UE-to-Network Relay in rel-13 was developed as a layer 3 relay. Thus, the relaying of data takes place in the IP layer. In other words, the ProSe UE-to-Network Relay resembles the function of an IP router, and the traffic to/from the Remote UE cannot be distinguished from other traffic to/from the ProSe UE-to-Network Relay, at least not by the eNB, since the eNB does not terminate the IP layer.

In order for the ProSe UE-to-Network Relaying to begin, the Prose UE-to-Network Relay UE and the ProSe Remote UE must first discover each other. The procedure to do this is that one of the UEs transmits a discovery message on the PC5 discovery channel, while the other UE monitors the PC5 discovery channel. There are two types of discovery types; Model A and B.

FIG. 4 illustrates model A discovery ("I am here"), in which, once the service has been authorised at step 401, the announcing UE, shown at 402a broadcasts information at step 403a at pre-defined intervals, necessary for other UEs to connect to it, which the discovering UE, shown at 402b, monitors at step 403b, and processes at step 404b when it detects a match. When applied to relay discovery, the relay UEs transmit such periodic announcements, and any remote UEs may monitor these announcements.

FIG. 5 illustrates model B discovery ("who is there?"/ "Are you there?), in which, once the service has been authorised at step 501, the announcing UE or discoverer UE, shown at 502b, transmits a request at step 503b with certain information it is interested to discover. The discovering UE, shown at 502a, monitors the PC5 link for ProSe query codes at step 503a, and can then respond at step 504a with information related to the discoverer's request if a ProSe query code matches. As shown at step 504b, the discoverer UE monitors PC5 for ProSe response codes. However, for Model B, only an authorized UE may announce or respond to the announcement. When applied to relay discovery, it is the remote UE which transmits the announcement (including some specific interest, e.g. which external network it wants to reach via the candidate relay UE), and the relay UE fulfilling the interest request will then have the opportunity to respond back.

Once the UEs have discovered each other, they can (if allowed by the network) establish a PC5 link between them and if allowed one of the UEs can be configured to relay traffic from the other UE to the network.

Recent developments in 3GPP now propose to introduce an evolved version of the ProSe UE-to-Network Relay, where relaying is instead operated on layer 2. This development is part of the Further Enhanced D2D (FeD2D) study item in 3GPP RAN as part of Rel-14.

An example scenario for FeD2D is a small low powered device, such as a wristwatch, which, in order to e.g. save battery power, instead of using the Uu radio interface, uses a D2D interface, such as LTE sidelink or some non-3GPP technology such as Bluetooth or WLAN to reach the network via an LTE UE (e.g. a smartphone) which operates as a relay. This scenario is also known as relaying for wearables, or alternatively relaying for Internet of Things (IoT). As this kind of relaying is a commercial D2D application (opposed to Public Safety), aspects such as security, charging and Quality of Service (QoS) are very important. Such aspects may be better solved by a layer 2 relay compared to a layer 3 relay.

An example of a protocol architecture for this layer 2 relay is illustrated in FIG. 6. In general, the Remote UE and the Relay UE can be connected to the same eNB, or different eNBs if there is an X2 connection between the eNBs. The serving eNB of the remote UE provides bearers to the core network via the GTP protocol, and so the core network may not be aware that the data of these bearers are actually relayed via the relay UE. Moreover, the remote UE has still its own PDN connection, with its own IP address, even if it uses the layer 2 relay.

The intra E-UTRAN handover (HO) of a UE in RRC_CONNECTED state is a UE-assisted network-controlled HO, with HO preparation signaling in E-UTRAN. The UE will perform regular measurements on its serving and neighboring cells. If the measurements fulfill certain thresholds, configured by the eNB, the UE will send a measurement report to the eNB. Based on the measurement results, the eNB may decide to handover the UE to a target eNB in which case the source eNB sends a handover request to the target eNB. FIG. 7a and FIG. 7b illustrate an X2-based handover for the case when both MME and Serving Gateway (SGW) are preserved, as shown in 3GPP TS 36.300.

As mentioned above, evolved ProSe UE-to-Network Relay using layer 2 relay takes place in E-UTRAN, i.e. in the serving eNBs of the remote UE and relay UE, as well as in the relay UE. FIG. 8 illustrates the scenario before relaying takes place. In this example, the Remote UE 801 and the Relay UE 803 are connected with different eNBs 805 and 807 respectively, and there is no relation between them. All bearers, such as DRB1, of the remote UE are connected directly with the serving eNB of the remote UE. FIG. 9 shows the situation while relaying takes place, in which the remote UE 901 has connected to the Relay UE 903. When a Remote UE is connected to a Relay UE over a direct interface, such as LTE sidelink, the traffic of one or several bearers (for example DRB1 in FIG. 9) is transported between the Remote UE 901 and the serving eNB 905 of the remote UE. The evolved ProSe UE-to-Network Relay function is now activated and it ensures that the DRB1 data packets, instead of over Uu, traverses via the Relay UE 903 and the serving eNB 907 of the Relay UE.

SUMMARY

According to the present invention, there are provided methods and network entities such as mobile devices and radio access network nodes that deal with issues relating to handover in the case of UE-to-Network relaying.

According to a first aspect of the present invention, there is provided a method of operation of a radio access network comprising a first radio access node and a second radio access node. The method comprises: determining that a first user equipment, UE, that is served by the first radio access node should start relaying through a second UE; determining whether the second UE is served by the first radio access node; and, in response to determining that the second UE is served not by the first radio access node but by the second radio access node, initiating a handover such that the first and second UEs are served by the same radio access node.

The step of initiating the handover may comprise determining whether to initiate handover of the first UE to the second radio access node or to initiate handover of the second UE to the first radio access node.

The step of determining whether to initiate handover of the first UE to the second radio access node or to initiate handover of the second UE to the first radio access node may be performed in the first radio access node, or in the second radio access node.

According to a second aspect, there is provided a radio access network, comprising a first radio access node and a second radio access node. The first radio access node and the second radio access node each comprise a processor and a memory. The memories contain instructions executable by the processors, such that the radio access network is operable to: determine that a first user equipment, UE, that is served by the first radio access node should start relaying through a second UE; determine whether the second UE is served by the first radio access node; and, in response to determining that the second UE is served not by the first radio access node but by the second radio access node, initiate a handover such that the first and second UEs are served by the same radio access node.

According to a third aspect, there are provided a computer program configured, when run on a computer, to carry out a method according to the first aspect, and a computer program product comprising a computer readable medium and such a computer program.

According to a fourth aspect, there is provided a method of operation of a first user equipment, UE, that is initially served by a first radio access node. The method comprises: determining to start relaying through a second UE that is served by a second radio access node; receiving a connection reconfiguration request from the first radio access node; initiating relaying through the second UE; and sending a response message, confirming that the connection reconfiguration is complete, to the second radio access node through the second UE.

According to a fifth aspect, there is provided a user equipment, comprising a processor and a memory. The memory contains instructions executable by the processor, such that the user equipment is operable to: determine to start relaying through a second UE that is served by a second radio access node; receive a connection reconfiguration request from the first radio access node; initiate relaying through the second UE; and send a response message, confirming that the connection reconfiguration is complete, to the second radio access node through the second UE.

According to a sixth aspect, there are provided a computer program configured, when run on a computer, to carry out a method according to the fourth aspect, and a computer program product comprising a computer readable medium and such a computer program.

According to a seventh aspect, there is provided a method of operation of a first radio access node in a radio access network further comprising a second radio access node. The method comprises: determining that a first user equipment, UE, that is served by the first radio access node should start relaying through a second UE; determining whether the second UE is served by the first radio access node; and, in response to determining that the second UE is served not by the first radio access node but by the second radio access node, determining whether to initiate handover of the first UE to the second radio access node or to initiate handover of the second UE to the first radio access node such that the first and second UEs are served by the same radio access node; and either instructing the second radio access node to initiate handover of the second UE to the first radio access node; or initiating handover of the first UE to the second radio access node.

According to an eighth aspect, there is provided a first radio access node in a radio access network further comprising a second radio access node. The first radio access node comprises a processor and a memory. The memory contains instructions executable by the processor, such that the first radio access node is operable to: determine that a first user equipment, UE, that is served by the first radio access node should start relaying through a second UE; determine whether the second UE is served by the first radio access node; and, in response to determining that the second UE is served not by the first radio access node but by the second radio access node, determine whether to initiate handover of the first UE to the second radio access node or to initiate handover of the second UE to the first radio access node such that the first and second UEs are served by the same radio access node; and either instruct the second radio access node to initiate handover of the second UE to the first radio access node; or initiate handover of the first UE to the second radio access node.

According to a ninth aspect, there are provided a computer program configured, when run on a computer, to carry out a method according to the seventh aspect, and a computer program product comprising a computer readable medium and such a computer program.

According to a tenth aspect, there is provided a method of operation of a second radio access node in a radio access network further comprising a first radio access node. The method comprises: receiving a request to handover a first user equipment, UE, that is served by the first radio access node, to the second radio access node, and to activate relaying through a second UE that is served by the second radio access node; determine whether it would be preferable to handover the first UE to the second radio access node or to initiate handover of the second UE to the first radio access node, such that the first and second UEs are served by the same radio access node; and either accepting the request to handover the first UE to the second radio access node; or initiating handover of the second UE to the first radio access node.

According to an eleventh aspect, there is provided a second radio access node in a radio access network further comprising a first radio access node. The second radio access node comprises a processor and a memory. The memory contains instructions executable by the processor, such that the second radio access node is operable to: receive a request to handover a first user equipment, UE, that is served by the first radio access node, to the second radio access node, and to activate relaying through a second UE that is served by the second radio access node; determine whether it would be preferable to handover the first UE to the second radio access node or to initiate handover of the second UE to the first radio access node, such that the first and second UEs are served by the same radio access node; and either accept the request to handover the first UE to the second radio access node; or initiate handover of the second UE to the first radio access node.

According to a twelfth aspect, there are provided a computer program configured, when run on a computer, to carry out a method according to the tenth aspect, and a computer program product comprising a computer readable medium and such a computer program.

According to a thirteenth aspect, there is provided a method of operation of a radio access network. The method comprises: when a first user equipment, UE, is served by a first radio access node and is relaying through a second UE that is served by a second radio access node, wherein the second radio access node may be the same as or different from the first radio access node, and when it is determined that one of the first and second UEs should handover to a target radio access node, determining whether to initiate a handover of the other of the first and second UEs.

When the second radio access node is the same as the first radio access node, the method may comprise determining whether to initiate a handover of the other of the first and second UEs to the target radio access node.

The method may comprise determining whether the target radio access node can support relaying with the radio access node serving the other of the first and second UEs.

The method may comprise determining whether the target radio access node can serve the other of the first and second UEs.

According to a fourteenth aspect, there is provided a radio access network. The network comprises a processor and a memory. The memory contains instructions executable by the processor, such that the radio access network is operable, when a first user equipment, UE, is served by a first radio access node and is relaying through a second UE that is served by a second radio access node, wherein the second radio access node may be the same as or different from the first radio access node, and when it is determined that one of the first and second UEs should handover to a target radio access node, to determine whether to initiate a handover of the other of the first and second UEs.

According to a fifteenth aspect, there are provided a computer program configured, when run on a computer, to carry out a method according to the thirteenth aspect, and a computer program product comprising a computer readable medium and such a computer program.

According to a sixteenth aspect, there is provided a method of operation of a first radio access node. The method comprises: when a first user equipment, UE, is served by the first radio access node and is relaying through a second UE that is also served by the first radio access node, determining that the first UE should relay through a third UE that is served by a second radio access node; initiating a handover of the first UE to the second radio access node; and initiating relaying from the first UE through the third UE.

The method may comprise determining that the first UE should relay through the third UE based on one or more measurement report from the first UE. The one or more measurement report received from the first UE may comprise a report indicating that a signal strength of the third UE is above a threshold, a report indicating that a signal strength of the third UE is higher by an offset value than the signal strength of the second UE, a report indicating that the signal strength of the second radio access node is higher by an offset than the signal strength of the first radio access node, or a report indicating that the signal strength of the second UE is below a threshold.

The method may comprise determining that the first UE should relay through the third UE based on one or more measurement report from the second UE.

The method may comprise determining that the first UE should relay through the third UE based on a report from the second UE indicating that it is no longer interested in relaying for the first UE.

The method may comprise determining that the first UE should relay through the third UE based on one or more measurement report from the third UE.

According to a seventeenth aspect, there is provided a first radio access node, comprising a processor and a memory. The memory contains instructions executable by the processor, such that the first radio access node is operable, when a first user equipment, UE, is served by the first radio access node and is relaying through a second UE that is also served by the first radio access node, to determine that the first UE should relay through a third UE that is served by a second radio access node; initiate a handover of the first UE to the second radio access node; and initiate relaying from the first UE through a third UE.

According to an eighteenth aspect, there are provided a computer program configured, when run on a computer, to carry out a method according to the sixteenth aspect, and a computer program product comprising a computer readable medium and such a computer program.

According to a nineteenth aspect, there is provided a method of operation of a first radio access node. The method comprises: when a first user equipment, UE, is served by the first radio access node and is relaying through a second UE that is also served by the first radio access node, determining that the first UE should be served by a second radio access node; initiating a handover of the first UE to the second radio access node; and deactivating relaying from the first UE through the second UE.

The method may comprise determining that the first UE should be served by a second radio access node based on one or more measurement report from the first UE, and/or based on one or more measurement report from the second UE.

According to a twentieth aspect, there is provided a first radio access node, comprising a processor and a memory.

The memory contains instructions executable by the processor, such that the first radio access node is operable to: when a first user equipment, UE, is served by the first radio access node and is relaying through a second UE that is also served by the first radio access node, determine that the first UE should be served by a second radio access node; initiate a handover of the first UE to the second radio access node; and deactivate relaying from the first UE through the second UE.

According to a twenty-first aspect, there are provided a computer program configured, when run on a computer, to carry out a method according to the nineteenth aspect, and a computer program product comprising a computer readable medium and such a computer program.

According to a twenty-second aspect, there is provided a method of operation of a first radio access node. The method comprises: when a first user equipment, UE, is served by the first radio access node and is relaying through a second UE that is also served by the first radio access node, receiving a handover request from a second radio access node relating to a third UE, the handover request requesting that the third UE should start relaying through the second UE; and determining whether to accept the handover request or to reject the handover request and to initiate a handover of the first UE and the second UE to the second radio access node.

The method may comprise making said determination based on: coverage of the first UE, second UE and third UE at the first radio access node and the second radio access node; and/or respective traffic loads at the first radio access node and the second radio access node; and/or capabilities of the first radio access node and the second radio access node; and/or relaying traffic of the first UE.

According to a twenty-third aspect, there is provided a first radio access node, comprising a processor and a memory. The memory contains instructions executable by the processor, such that the first radio access node is operable to: when a first user equipment, UE, is served by the first radio access node and is relaying through a second UE that is also served by the first radio access node, receive a handover request from a second radio access node relating to a third UE, the handover request requesting that the third UE should start relaying through the second UE; and determine whether to accept the handover request or to reject the handover request and to initiate a handover of the first UE and the second UE to the second radio access node.

According to a twenty-fourth aspect, there are provided a computer program configured, when run on a computer, to carry out a method according to the twenty-second aspect, and a computer program product comprising a computer readable medium and such a computer program.

According to a twenty-fifth aspect, there is provided a method of operation of a first user equipment, UE. The method comprises: on determining that the first UE wishes to use relaying, including an identity of its current serving cell in a relay discovery announcement.

According to a twenty-sixth aspect, there is provided a method of operation of a second user equipment, UE. The method comprises: receiving a relay discovery announcement from a first UE, wherein the relay discovery announcement indicates that the first UE wishes to use relaying and includes an identity of a current serving cell of the first UE; and using the identity of the current serving cell of the first UE in determining how to respond to the received relay discovery announcement.

According to a twenty-seventh aspect, there is provided a method of operation of a second user equipment, UE. The method comprises: on determining that the second UE is able to act as a relay, including an identity of its current serving cell in a relay discovery announcement.

According to a twenty-eighth aspect, there is provided a method of operation of a first user equipment, UE. The method comprises: receiving a relay discovery announcement from a second UE, wherein the relay discovery announcement indicates an ability of the second UE to act as a relay, and includes an identity of a current serving cell of the second UE; and using the identity of the current serving cell of the second UE in determining how to respond to the received relay discovery announcement.

According to a twenty-ninth aspect, there is provided a method of operation of a first user equipment, UE. The method comprises: on determining that the first UE wishes to use relaying, including a temporary UE identity in a relay discovery announcement.

According to a thirtieth aspect, there is provided a method of operation of a second user equipment, UE. The method comprises: receiving a relay discovery announcement from a first UE, wherein the relay discovery announcement indicates that the first UE wishes to use relaying and includes a temporary UE identity of the first UE; and transmitting the temporary UE identity to a radio access network node serving the second UE.

According to a thirty-first aspect, there is provided a method of operation of a radio access network node serving a second user equipment, UE. The method comprises: receiving a message from the second UE, the message comprising a temporary UE identity of a first UE transmitted by the first UE in a relay discovery announcement, wherein the relay discovery announcement indicates that the first UE wishes to use relaying; determining if said radio access network node is a serving radio access node of the first UE; and, if so, responding to the second UE, causing the second UE to respond to the first UE.

According to a thirty-second aspect, there is provided a method of operation of a second user equipment, UE. The method comprises: on determining that the second UE is able to act as a relay, including a temporary UE identity in a relay discovery announcement.

According to a thirty-third aspect, there is provided a method of operation of a first user equipment, UE. The method comprises: receiving a relay discovery announcement from a second UE, wherein the relay discovery announcement indicates an ability of the second UE to act as a relay, and includes a temporary UE identity of the second UE; and transmitting the temporary UE identity to a radio access network node serving the first UE.

According to a thirty-fourth aspect, there is provided a method of operation of a radio access network node serving a first user equipment, UE. The method comprises:

receiving a message from the first UE, the message comprising a temporary UE identity of a second UE transmitted by the second UE in a relay discovery announcement, wherein the relay discovery announcement indicates that the second UE is capable of relaying; determining if said radio access network node is a serving radio access node of the second UE; and, if so, responding to the first UE, causing the first UE to respond to the second UE.

According to a thirty-fifth aspect, there is provided a user equipment, comprising a processor and a memory. The memory contains instructions executable by the processor, such that the user equipment node is operable to perform a method in accordance with any one of the twenty-fifth to thirtieth, thirty-second, or thirty-third aspects.

According to a thirty-sixth aspect, there is provided a radio access node, comprising a processor and a memory.

The memory contains instructions executable by the processor, such that the radio access node is operable to perform a method in accordance with any one of thirty-first or thirty-fourth aspects.

According to a thirty-seventh aspect, there are provided a computer program configured, when run on a computer, to carry out a method according to any of the twenty-fifth to thirty-fourth aspects, and a computer program product comprising a computer readable medium and such a computer program.

DETAILED DESCRIPTION

Figure 1:
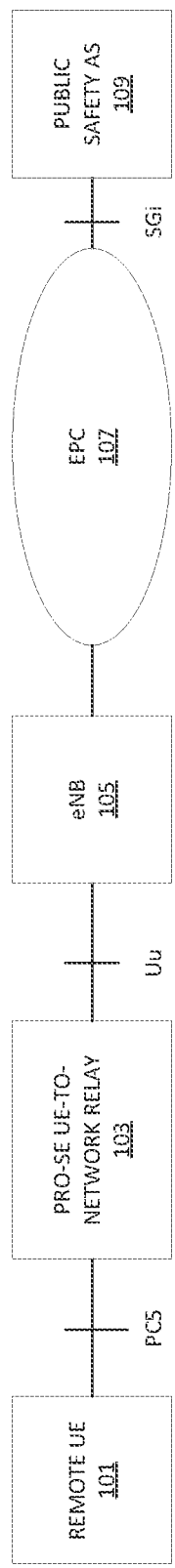
FIG. 1 shows a part of a network.
Figure 2:
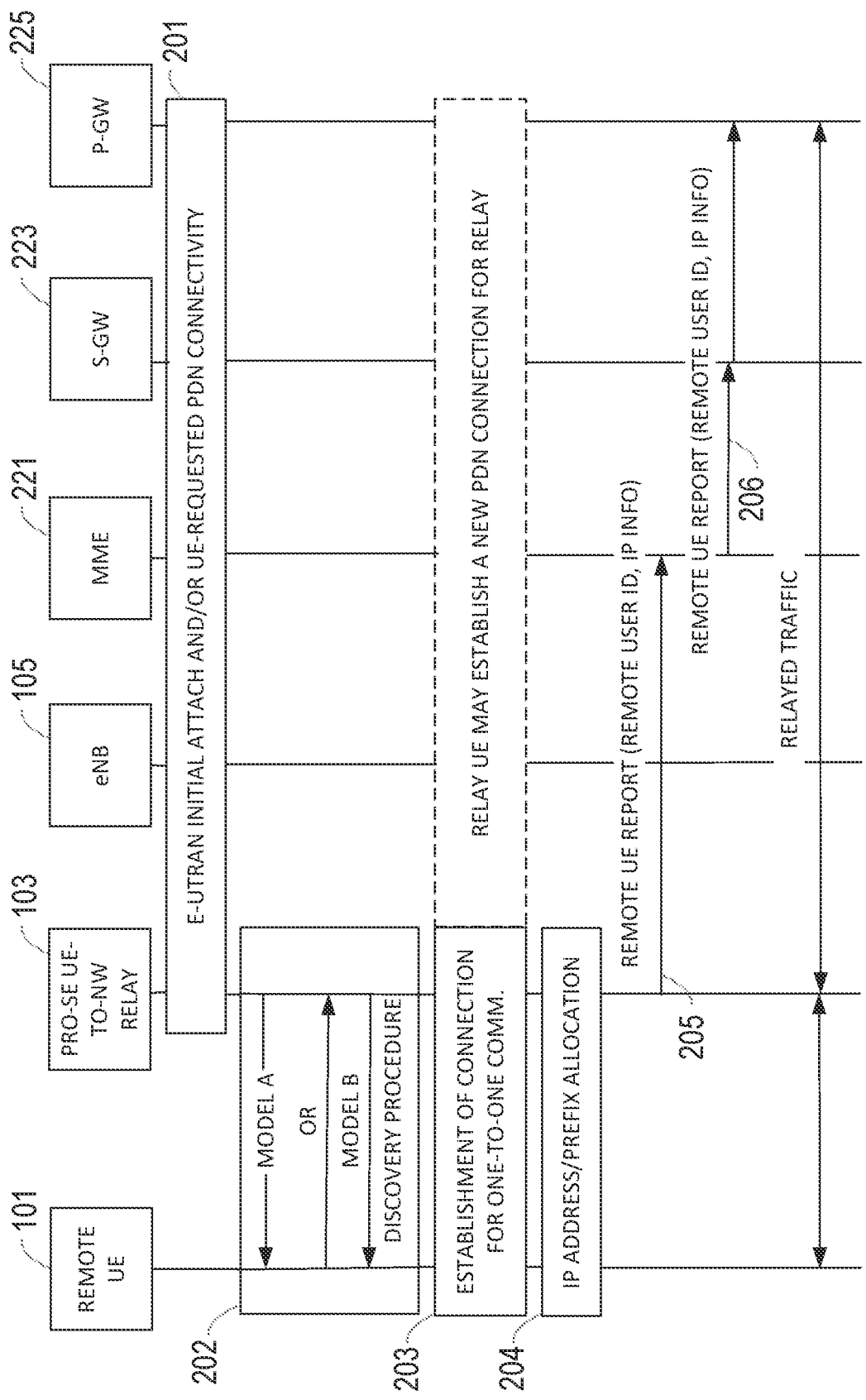
FIG. 2 illustrates signalling in the network of FIG. 1.
Figure 3:
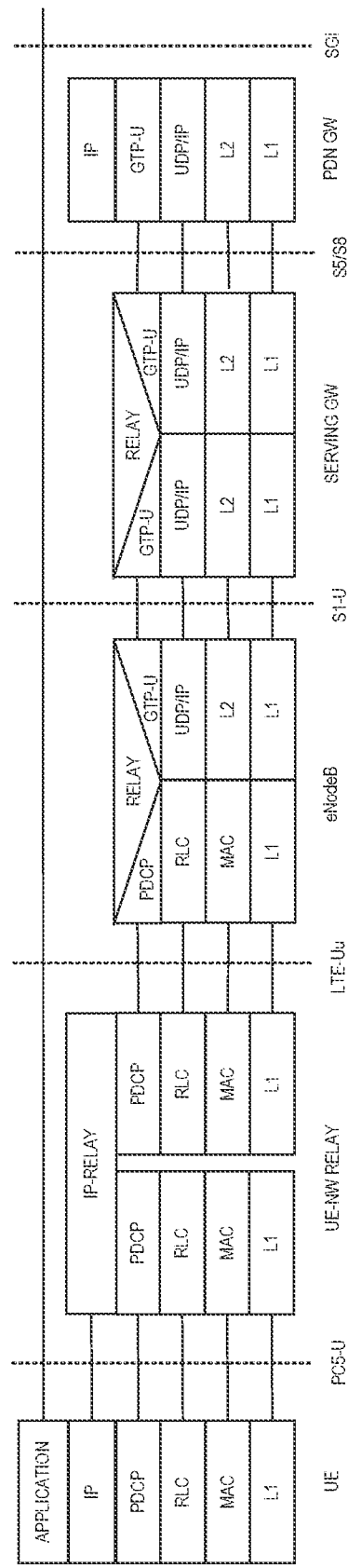
FIG. 3 illustrates signalling in the network of FIG. 1.
Figure 4:
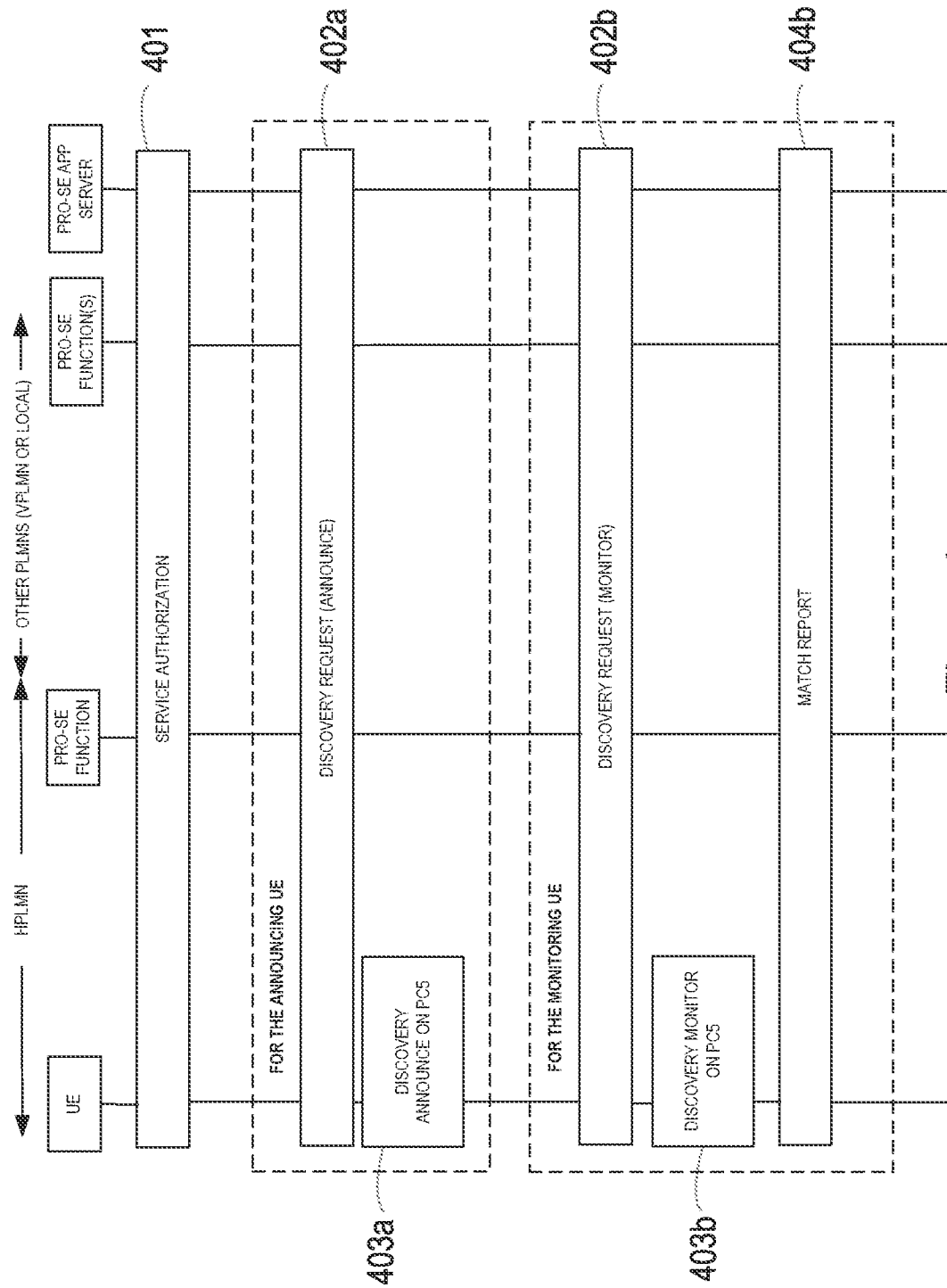
FIG. 4 illustrates signalling in the network of FIG. 1.
Figure 5:
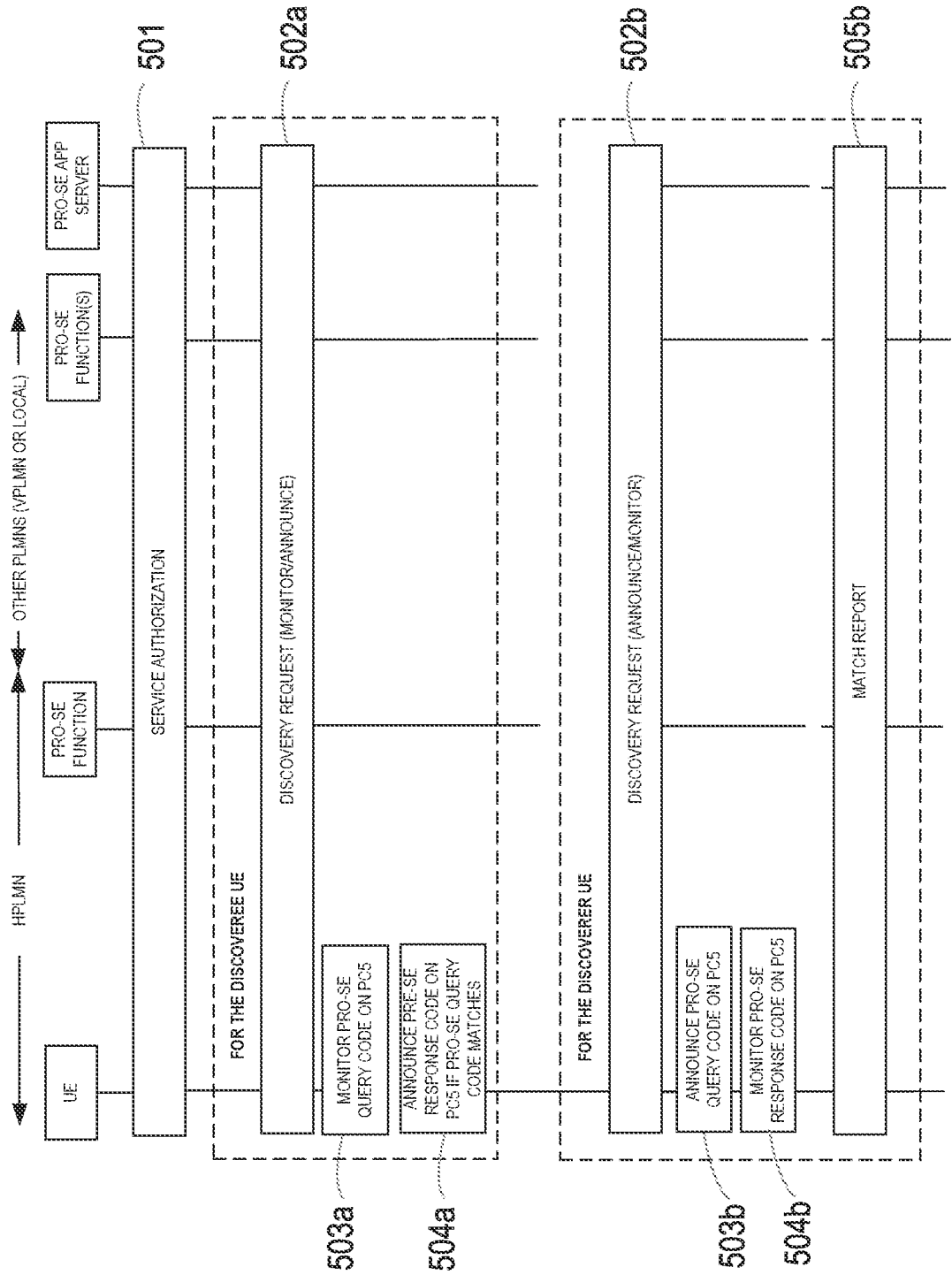
FIG. 5 illustrates signalling in the network of FIG. 1.
Figure 6:
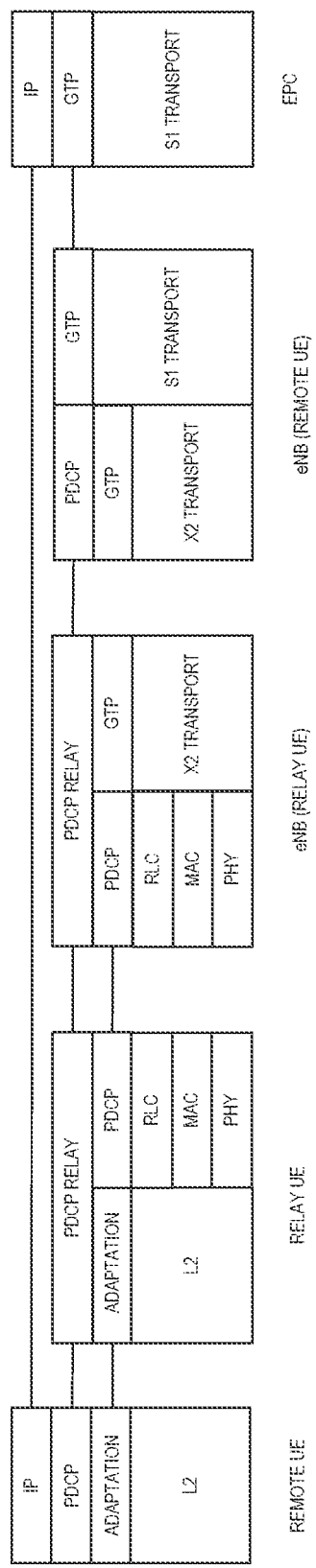
FIG. 6 illustrates signalling in the network of FIG. 1.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing modules or one or more controllers, and the terms computer, processor, processing module and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description is given for user equipment (UE), it should be understood by the skilled in the art that "UE" is a non-limiting term comprising any mobile or wireless device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the terms "mobile station" ("MS"), "mobile device" and "terminal device" may be used interchangeably in the following description, and it will be appreciated that such a device does not necessarily have to be 'mobile' in the sense that it is carried by a user. Instead, the term "mobile device" encompasses any device that is capable of communicating with communication networks that operate according to one or more mobile communication standards, such as the Global System for Mobile communications, GSM, UMTS, Long-Term Evolution, LTE, IEEE 802.11 or 802.16, etc.

The description involves communication between a UE and a radio access network, which typically includes multiple radio access nodes. In the specific example given, the radio access nodes take the form of eNodeBs (eNBs), as defined by 3GPP. However, it will be appreciated that the invention may involve any radio access nodes. Moreover, where the following description refers to steps taken in or by a radio access node, this also includes the possibility that some or all of the processing and/or decision making steps may be performed in a device that is physically separate from the radio antenna of the radio access node, but is logically connected thereto. Thus, where processing and/or decision making is carried out "in the cloud", the relevant processing device is considered to be part of the radio access node for these purposes.

It is possible for a user equipment (UE) (referred to herein as a remote UE) to use another UE (referred to herein as a relay UE) as a relay, when the two UEs are controlled by separate eNBs. However, it is now recognized that, for evolved ProSe-to-Network Relay, the serving eNodeBs (eNBs) for the remote UE and the relay UE should preferably be the same node in order for the relay to operate efficiently. For example, if the remote UE and the relay UE have separate serving eNBs, the relayed data would need to be transmitted over the inter-eNB links (known as the X2 interface). These links are normally used only for signalling and temporary packet forwarding during inter-eNB handover and are typically not dimensioned to handle the amount of traffic that would be the result of evolved UE-to-Network relay with different serving eNBs of the involved UEs. In particular, these links are typically associated with considerable delays which will vary depending on the traffic congestion. If the control signals from the serving eNB of the Remote UE need to traverse the X2 link before being relayed through the Relay UE, the added latencies can be detrimental to the performance.

Thus, it is now recognized that it may be advantageous to ensure that the remote UE and the relay UE are served by the same eNB. This can be achieved in several ways. However, in some cases this is not possible. For example, in the wearables scenario, a user has a small device (e.g. a wristwatch) which should be relayed by another specific device (e.g. the user's smartphone) and there are no alternative relay UEs available. In some scenarios, these two devices are controlled by different eNBs. For example, the wristwatch uses narrowband IoT connection to E-UTRAN and this type of technology may only be supported by specific eNBs and these eNBs may not support ordinary LTE (as used by the smartphone).

Figure 10:
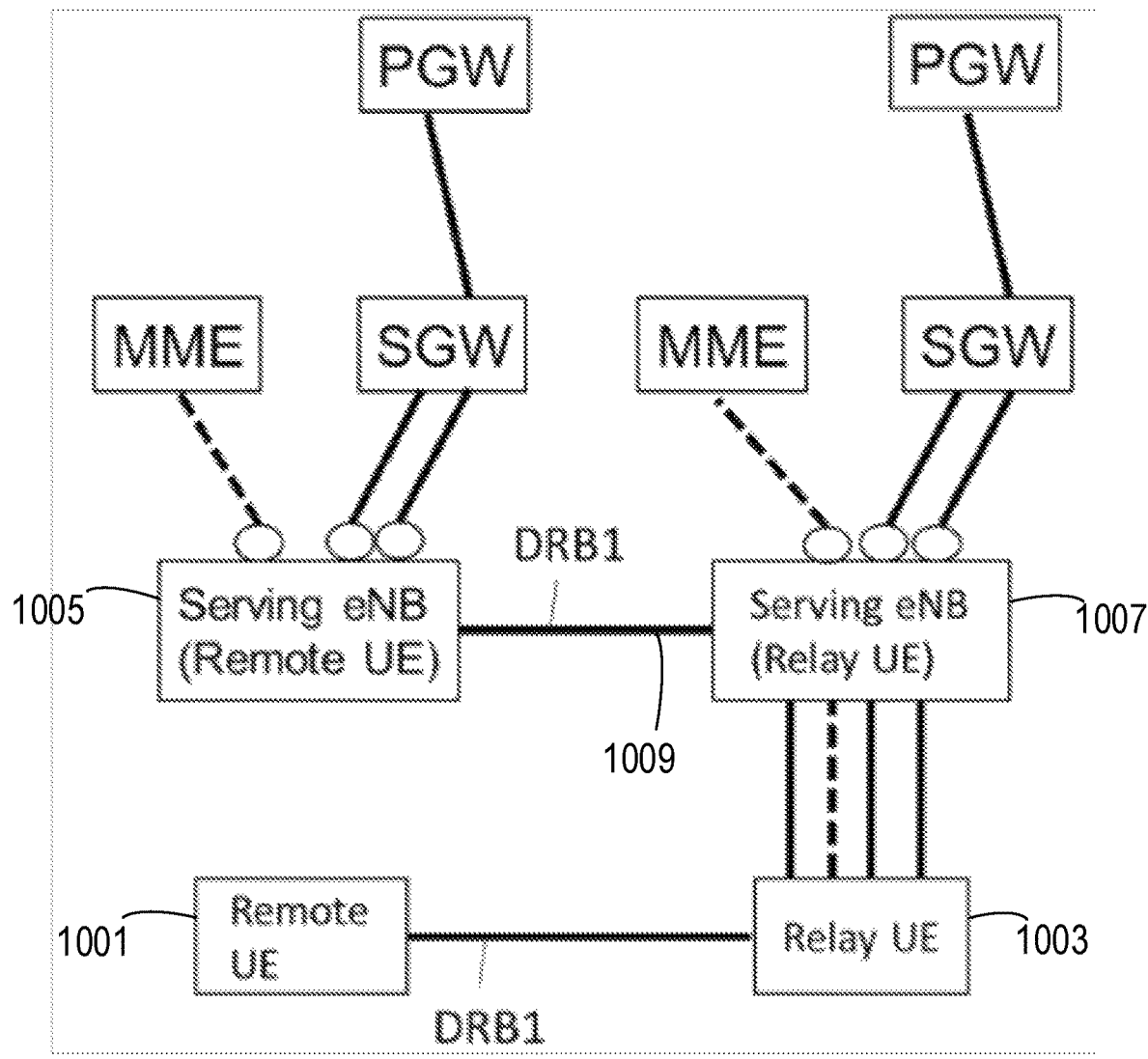
FIG. 10 illustrates connections in a network.

On the other hand, as shown in FIG. 10, when relaying is setup between the remote UE 1001 and the relay UE 1003, the LTE-Uu connection between the remote UE 1001 and the serving eNB 1005 of the remote UE is typically not needed any more, as the relayed data (DRB1) would traverse over the inter-eNB link (X2 interface) 1009 between the serving eNB 1005 of the remote UE and the serving eNB 1007 of the relay UE. However, as described above there are severe drawbacks with that solution.

Figure 11:
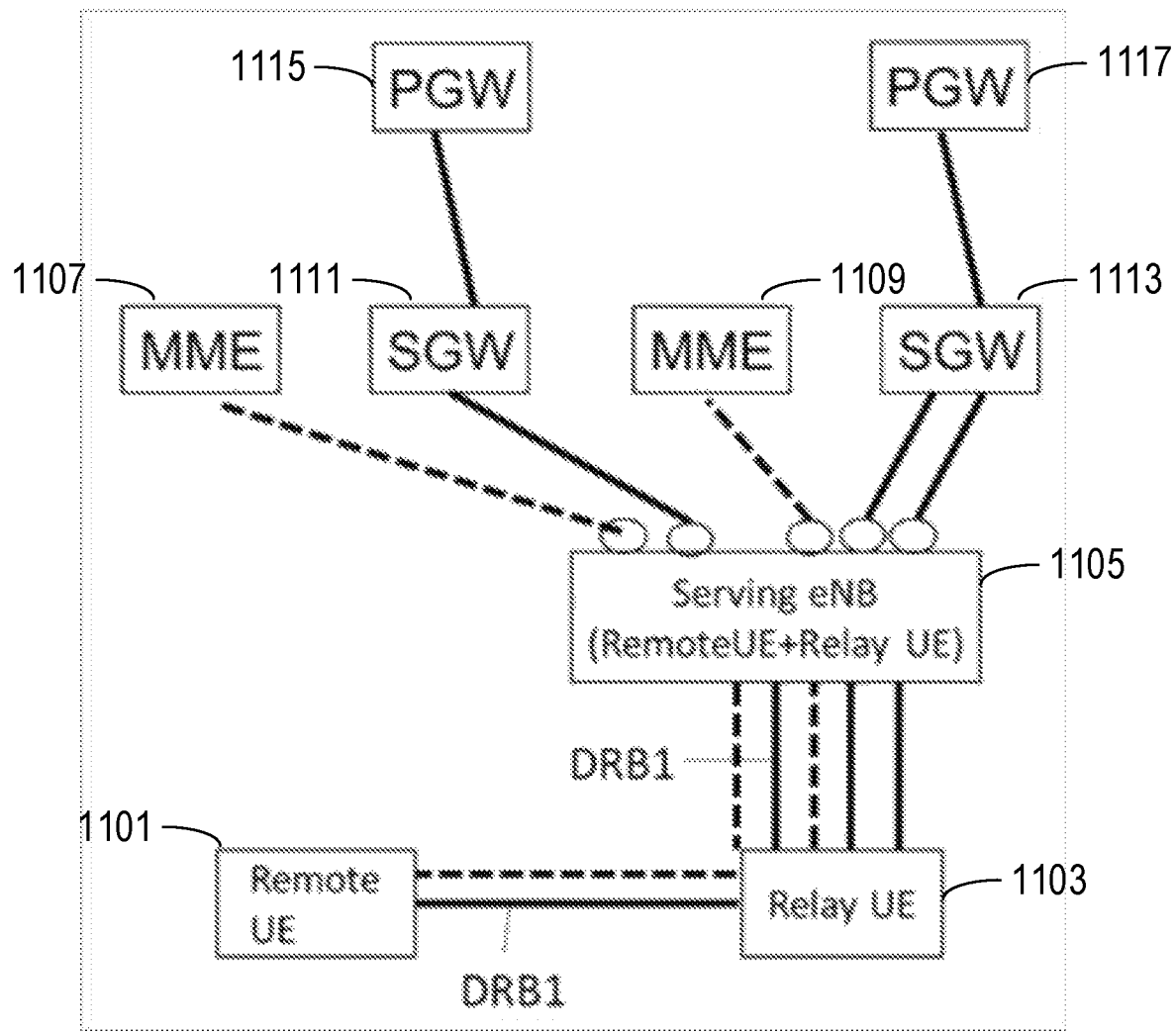
FIG. 11 illustrates connections in a network.

FIG. 11 illustrates an alternative situation, in which the two UEs, namely the remote UE 1101 and the relay UE 1103, are served by the same eNB 1105 (which may, however, have connections to separate respective core network nodes such as the Mobility Management Entity (MME) 1107, 1109; Serving Gateway (S-GW) 1111, 1113; and Packet Gateway (P-GW) 1115, 1117 for the remote UE 1101 and the relay UE 1103.

In 3GPP, the X2-based handover procedure is used to transfer the UE context from a source eNB to a target eNB, while keeping the same serving MME and Serving Gateway (SGW). This procedure is however designed for the case when a UE performs handover between two cells each served by one of these eNBs, which is not the case here. Moreover, to have the remote UE controlled by its previous serving eNB when the relaying is setup, and then perform a handover may be seen as an unnecessary intermediate step, with also the drawbacks of transfer the relayed data via X2 interface.

Thus, according to a first problem, there is a need for a way to make sure the relay UE and the remote UE are served by the same eNB after relaying is setup, even if they were served by different eNBs before the relaying takes place.

A second problem is how to manage the mobility of the relay UE and remote UE after relaying has been established, e.g. when one of the UEs need to perform a handover due to mobility. For example, if Remote UE is connected through the Relay UE as shown in FIG. 11, and the Relay UE receives differing reference signals (e.g. due to mobility) in such way that they fulfill some measurement event where a neighboring cell is better than the serving cell resulting in that the UE sends a measurement report to the eNB. If the Relay UE would not be involved in relaying, the eNB would in most cases abide by the measurement report and request a handover to the cell indicated as the best in the measurement report (exceptions could be e.g. due to load balancing scenarios or other implementations in the eNB). However, if the Relay UE is relaying traffic from the Remote UE when it fulfills its measurement event, it is not clear how the Relay UE, Remote UE, nor the eNB should handle this.

For example, a typical scenario could be a Remote UE (e.g. a smart watch) connected to a Relay UE (e.g. a smart phone) both carried by a single person who is moving around while relaying traffic. When the smart phone leaves one cell, it should handover to another cell while the sidelink to the smart watch is maintained.

Another typical scenario could be a Remote UE (e.g. a fixed sensor) connected to a Relay UE (e.g. a smart phone). If the Relay UE moves away from the Remote UE, the Relay UE should be handed over to another eNB.

There are multiple main modes of the invention.

One advantage of some embodiments is that the remote UE and relay UE are served by the same eNB whenever possible. This avoids the need for relayed data to be transferred over the inter-eNB links (X2 interface).

A second advantage is that packet loss due to the activation of relaying is avoided, even in case of a combined activation and handover.

Moreover, in some embodiments, the network can coordinate the handover of two or more UEs involved in sidelink communication, which can insure that service continuity is maintained even when the Evolved ProSe Remote UE and Evolved ProSe UE-to-Network Relay UE is moving. This may also ensures that, if the two UEs are moving away from each other, only one of the UEs perform the handover.

In the first mode of the invention, the objective is to ensure that a remote UE and relay UE, which are served by different eNBs before relaying is activated for the remote UE, are served by same eNBs after relaying is activated.

Figure 12:
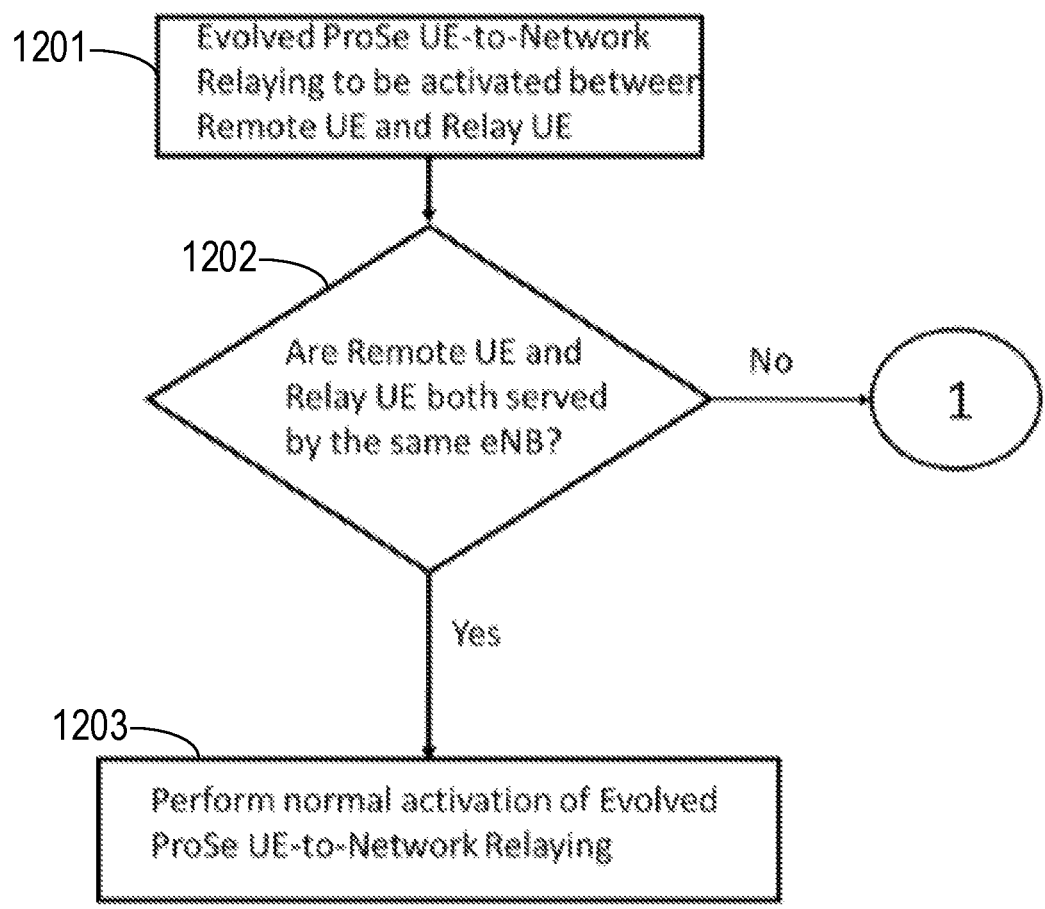
FIG. 12 illustrates a part of a method performed in a network.
Figure 13:
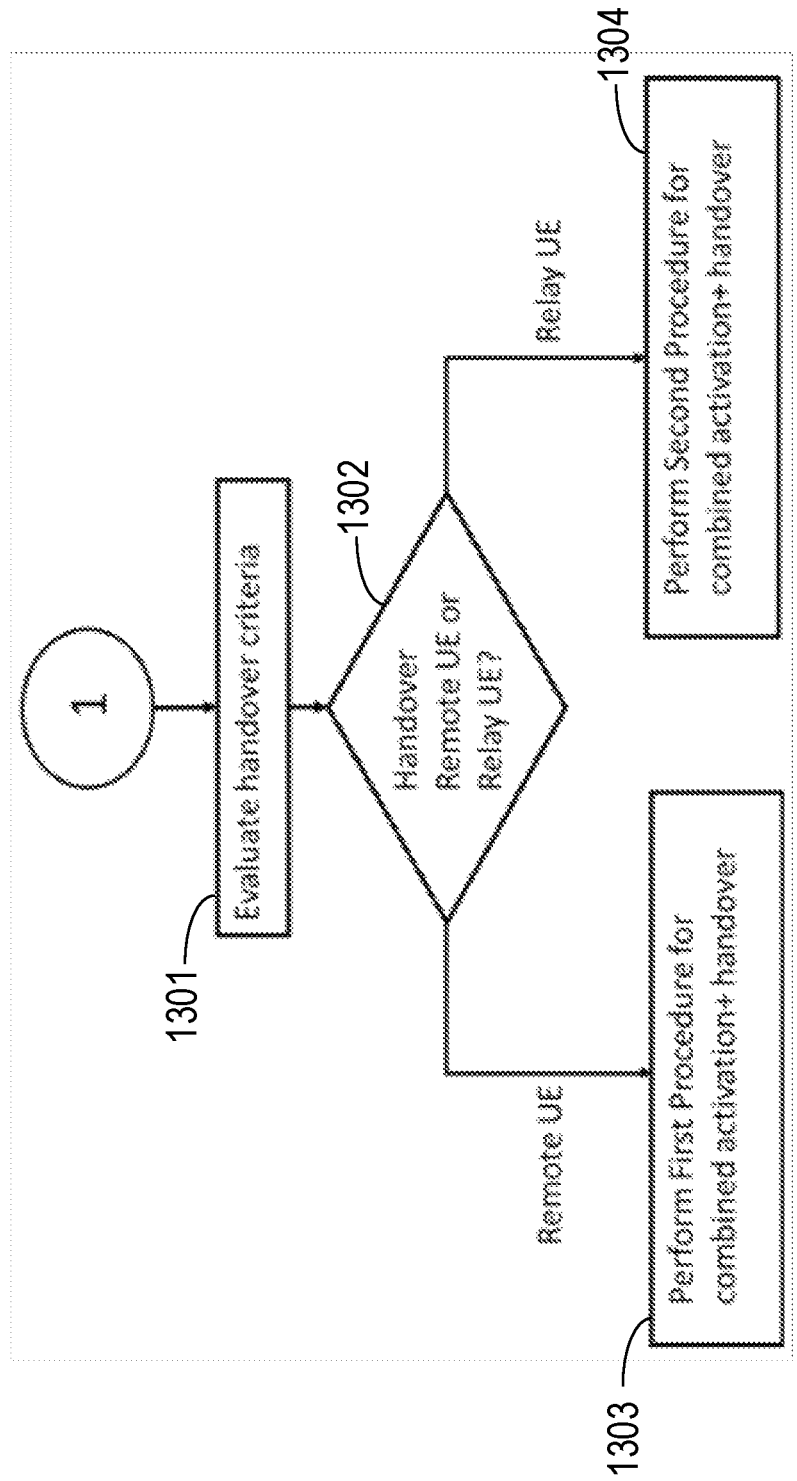
FIG. 13 illustrates another part of a method performed in a network.

This mode—mainly addressing the first problem above—is used when the activation of the evolved ProSe UE-to-Network relaying takes place. In this mode, the activation of the evolved ProSe UE-to-Network relaying between a remote UE and a relay UE, is combined with an inter-eNB handover of either the relay UE or the remote UE, to ensure the two UEs are served by the same eNB after the activation of relaying. The main steps of the first mode of the invention are illustrated in FIG. 12 and FIG. 13, which illustrate the steps taken in the radio access network. We assume that the remote UE is initially in RRC_CONNECTED state and typically it also has one or several bearers which could be subject to being routed via the relay UE after the activation of relaying.

At step 1201, it is determined that evolved ProSe UE-to-Network relaying should be activated between a remote UE and a relay UE. At step 1202, it is determined whether the remote UE and the relay UE are both served by the same eNB. For example, information which is used to identify the eNB served by the Relay UE is sent from the Relay UE to the Remote UE as part of the discovery procedure. (This is also described as part of the sixth mode of the invention, below, in more detail). This information is passed from the Remote UE to the eNB serving the Remote UE, e.g. in a measurement report triggering the decision by the eNB to activate relaying. The information may be a temporary identity of the Relay UE, assigned by the eNB serving the Relay UE, and this identity is used to determine the eNB serving the Relay UE.

If the remote UE and the relay UE are both served by the same eNB, the process passes to step 1203, in which a normal activation of evolved ProSe UE-to-Network relaying is performed.

If the remote UE and the relay UE are not both served by the same eNB, the process passes to the steps shown in FIG. 13. Specifically, at step 1301, handover criteria are evaluated. Based on these criteria, it is decided at step 1302, whether to handover the remote UE or the relay UE. This decision may be made either in the eNB serving the remote UE or in the eNB serving the relay UE. If it is decided at step 1302 to handover the remote UE, the process passes to step 1303, in which a first procedure for combined activation and handover is performed. If it is decided at step 1302 to handover the relay UE, the process passes to step 1304, in which a second procedure for combined activation and handover is performed.

Thus, the first mode of the invention includes evaluation steps which results in an execution step, which in turn may result in that one of three different procedures are performed. Depending on the results of the evaluation, one of these procedures are performed:
1. Normal activation of evolved ProSe UE-to-Network relaying as shown at step 1203. This procedure does not include handover and is typically performed when both UEs are already served by the same eNB or when one of the UEs are in RRC_IDLE.
2. First procedure for combined activation and handover as shown at step 1303. In this case, a handover procedure to relocate the context of the Remote UE to the same eNB as currently serving the relay UE is performed, combined with the activation of the relaying. The decision to handover the remote UE may be made either by the eNB serving the relay UE or by the eNB serving the relay UE.
3. Second procedure for combined activation and handover as shown at step 1304. In this case, a handover procedure to relocate the context of the Relay UE to the same eNB as currently serving the Remote UE is performed, combined with the activation of the relaying. The decision to handover the relay UE may be made either by the eNB serving the relay UE or by the eNB serving the relay UE.

The normal procedure for activation of relaying as shown at step 1203 currently consists of several steps:
1. Determining that a Remote UE should use a relay;
2. Determining which Relay UE should be used by the Remote UE;
3. Ensuring that the Relay UE has a context in an eNB;
4. Establishing a link between the Remote UE and the Relay UE (e.g. PC5 sidelink or non-3GPP such as Bluetooth or WLAN);
5. Establishing a RRC context for the Remote UE in an eNB
   a. The Remote UE could already have a context in the eNB, then the context would be reconfigured for relaying instead of direct communication
   b. The context could be established in the eNB that the Remote UE is camping on (which can be the same or a different eNB than the eNB that the Relay UE is served by);
6. Reconfiguring the Remote UE context and the Relay UE context so that the Remote UE eNB sends bearers through Relay UE eNB; and
7. Reconfiguring the Relay UE to forward relaying bearers to the Remote UE.

Figure 14:
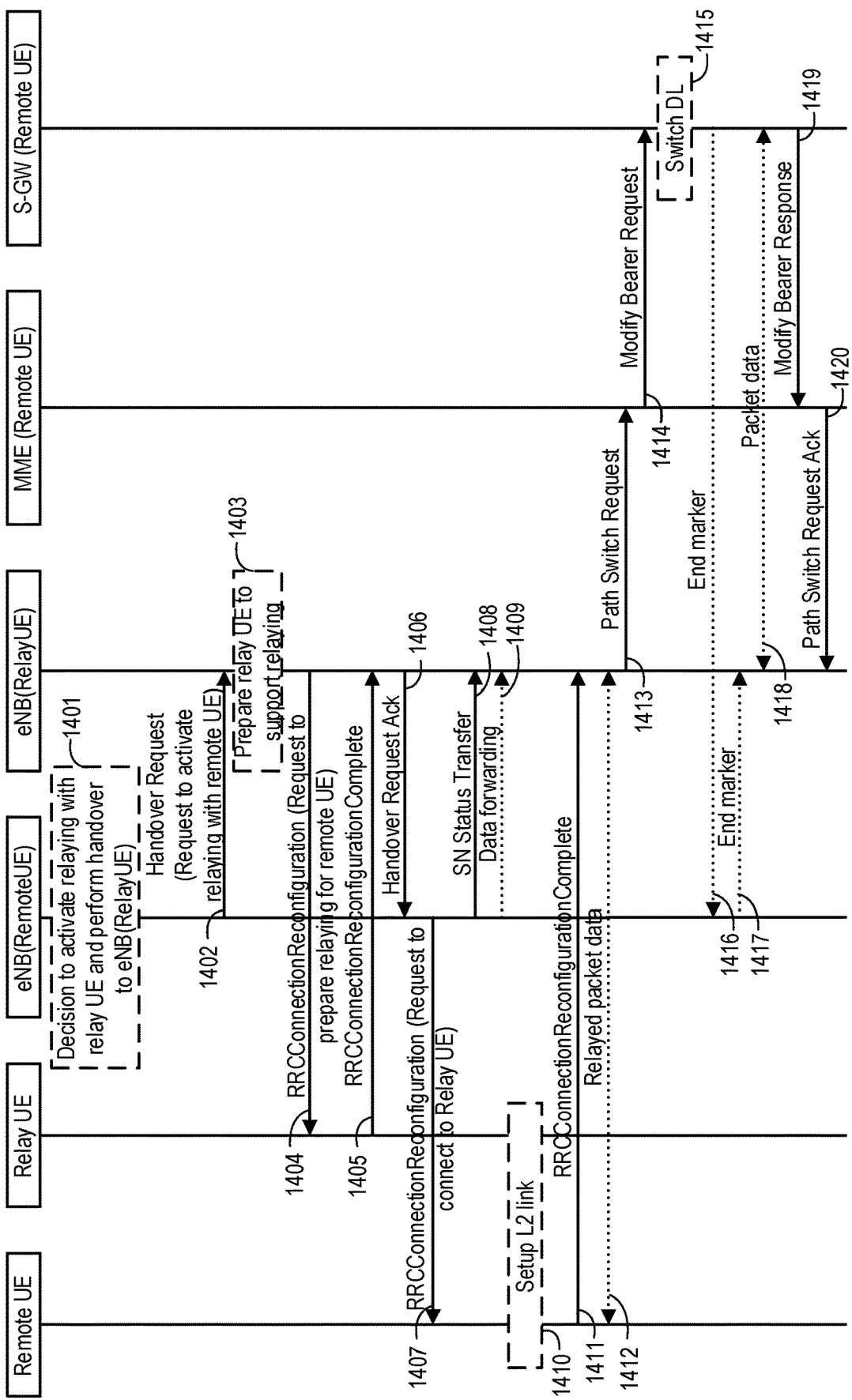
FIG. 14 illustrates signalling in a network.

The first procedure for combined activation of relaying and handover (involving handover of the remote UE), as shown at step 1303, is illustrated in FIG. 14. FIG. 14 illustrates the case where the decision to handover the remote UE is made by the eNB serving the remote UE.

At step 1401, the serving eNB of the Remote UE determines in which eNB the particular Relay UE is served. For example, as described in more detail below, the Relay UE may transmit a temporary identity during the relay discovery process, and this will be read by the Remote UE and transmitted to the serving eNB of the Remote UE so that the temporary identity of the Relay UE can be used for eNB determination.

In this illustrated example, the serving eNB of the Remote UE identifies that the Relay UE is served by a different eNB, and there is a decision by the serving eNB of the Remote UE, referred to here as eNB(Remote UE)) to activate relaying with the Relay UE and perform handover of the Remote UE to the eNB that is serving the Relay UE, referred to here as eNB(Relay UE).

At step 1402, a handover request is sent from the source eNB (i.e. eNB(Remote UE)) to the target eNB (i.e. eNB(Relay UE)). This includes a request to activate relaying with the Remote UE. In the Handover request message, information is included that is used to find the Relay UE context in the eNB serving the Relay UE. It may for example be a temporary identity of the Relay UE, for example obtained by the Remote UE as part of the relay discovery process as mentioned above and sent to the eNB serving the Remote UE.

At step 1403, the eNB serving the relay UE has the opportunity to make a decision whether to accept the proposal from the source eNB to accept the handover of the Remote UE, or whether to propose instead that the Relay UE should be handed over to the eNB serving the Remote UE. In this illustrated case, eNB(Relay UE) determines to accept the handover, and so it prepares context of Relay UE to support relaying. This includes setting up bearers and configurations how the bearers of the Remote UE are mapped to the bearers of the Relay UE. This may also include fetching identifiers or configurations from the core network.

At step 1404, a RRCConnectionReconfiguration is sent from eNB(Relay UE) to the Relay UE with a request to prepare to relay for Remote UE.

At step 1405, a RRCConnectionReconfigurationComplete message is sent from the Relay UE to eNB(Relay UE) acknowledging that the reconfiguration was successful.

At step 1406, a Handover Request Ack is sent by eNB (Relay UE) to eNB(Remote UE) acknowledging that the Remote UE can handover to the eNB(Relay UE).

At step 1407, a RRCConnectionReconfiguration is sent from eNB(Remote UE) to the Remote UE configuring the Remote UE how to use the relayed bearers set up in steps 1403 and 1404.

At step 1408, an SN Status transfer is sent from eNB (Remote UE) to eNB(Relay UE) indicating the sequence number (SN) status of the Remote UE.

At step 1409, data forwarding is sent from eNB(Remote UE) to eNB(Relay UE) containing any downlink data packets to the Remote UE which have not yet been sent and acknowledged.

At step 1410, an L2 link is set up between the Remote UE and the Relay UE. The method used depends on which access is used (for example 3GPP sidelink, Bluetooth, or WLAN) in order to achieve one-to-one communication.

At step 1411, a RRCConnectionReconfigurationComplete message is sent from the Remote UE to the eNB(Relay UE). This message could be sent through the Relay UE indicating that the bearers are functioning, but it is also possible to send this message through the eNB(Remote UE) instead.

At step 1412, user data, i.e. packet data, is forwarded, i.e. relayed, over the sidelink between the Relay UE and the Remote UE.

At step 1413, a Path switch request is sent. That is, eNB(Relay UE) sends a request to the MME of the Remote UE to switch the bearers.

At step 1414, a Modify bearer request is sent. That is, the MME of the Remote UE sends a request to the SGW of the Remote UE to setup a new path to the eNB(Relay U E).

At step 1415, Switch DL, the SGW of the Remote UE reconfigures the downlink (DL) bearers in order to use the new path, to the eNB(Relay UE) and transmits one or several end marker packets on the old path to the eNB (Remote UE).

At step 1416, End marker, the SGW of the Remote UE notifies eNB(Remote UE) that the switch is complete. The eNB(Remote UE) forwards the end marker packet to the eNB(Relay UE).

At step 1417, End marker, eNB(Remote UE) notifies eNB(Relay UE) that the switch is complete and the X2 data forwarding bearer can now be released.

At step 1418, Packet data, the SGW of the Remote UE now sends downlink data to eNB(Relay UE) over the new path.

At step 1419, Modify bearer response, the SGW of the Remote UE confirms that the path switch operation has been completed.

At step 1420, Path switch request ACK, the MME of the Remote UE sends a request to the eNB(Relay UE) to confirm the path switch.

Figure 15:
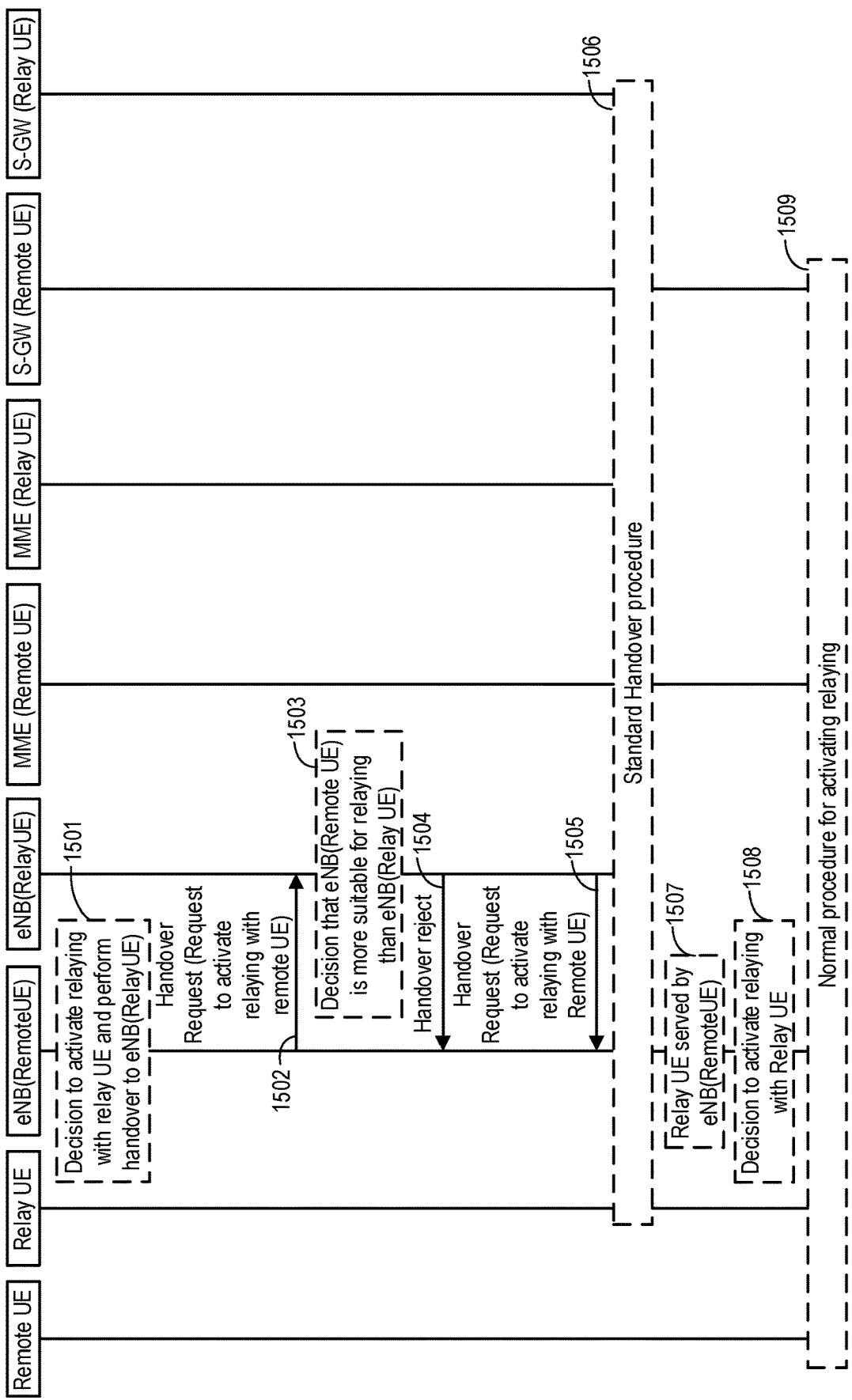
FIG. 15 illustrates signalling in a network.

The second procedure for combined activation of relaying and handover (involving handover of the relay UE), as shown at step 1304, is illustrated in FIG. 15. FIG. 15 illustrates the case where the decision to handover the relay UE is made by the eNB serving the relay UE.

At step 1501, the eNB serving the remote UE determines in which eNB the particular Relay UE is served. For example, as described in more detail below, the Relay UE may transmit a temporary identity during the relay discovery process, and this will be read by the Remote UE and transmitted to the serving eNB of the Remote UE so that the temporary identity of the Relay UE can be used for eNB determination.

In this illustrated example, the serving eNB of the Remote UE identifies that the Relay UE is served by a different eNB, and there is a decision by the serving eNB of the Remote UE, referred to here as eNB(Remote UE)) to activate relaying with the Relay UE and perform handover of the Remote UE to the eNB that is serving the Relay UE, referred to here as eNB(Relay UE).

Thus, at step 1502, the eNB(Remote UE) sends a request to eNB(RelayUE) to handover the Remote UE in order to activate relaying. This handover request includes a request to activate relaying with the Remote UE. In the Handover request message, information is included that is used to find the Relay UE context in the eNB serving the Relay UE. It may for example be a temporary identity of the Relay UE, for example obtained by the Remote UE as part of the relay discovery process as mentioned above and sent to the eNB serving the Remote UE.

At step 1503, eNB(RelayUE) makes a decision that eNB(Remote UE) is more suitable for relaying than eNB (Relay UE). For example, the serving eNB of the Relay UE may be aware that the eNB(Remote UE) is sufficiently good to serve the Relay UE (based on previous measurement reports). In addition, eNB(Relay UE) may not have sufficient resources or capabilities to allow relaying but eNB (Remote UE) may have.

Thus, at step 1504, eNB(Relay UE) sends a Handover reject message, informing eNB(Remote UE) that the Remote UE cannot handover to eNB(Relay UE).

At step 1505, eNB(Relay UE) sends a request to eNB (Remote UE) to handover Relay UE to eNB(Remote UE) and also inform eNB(Remote UE) that Relay UE is a candidate for relaying for Remote UE (This message can be sent together with the previous message (i.e. the handover reject message)).

Figure 7A:
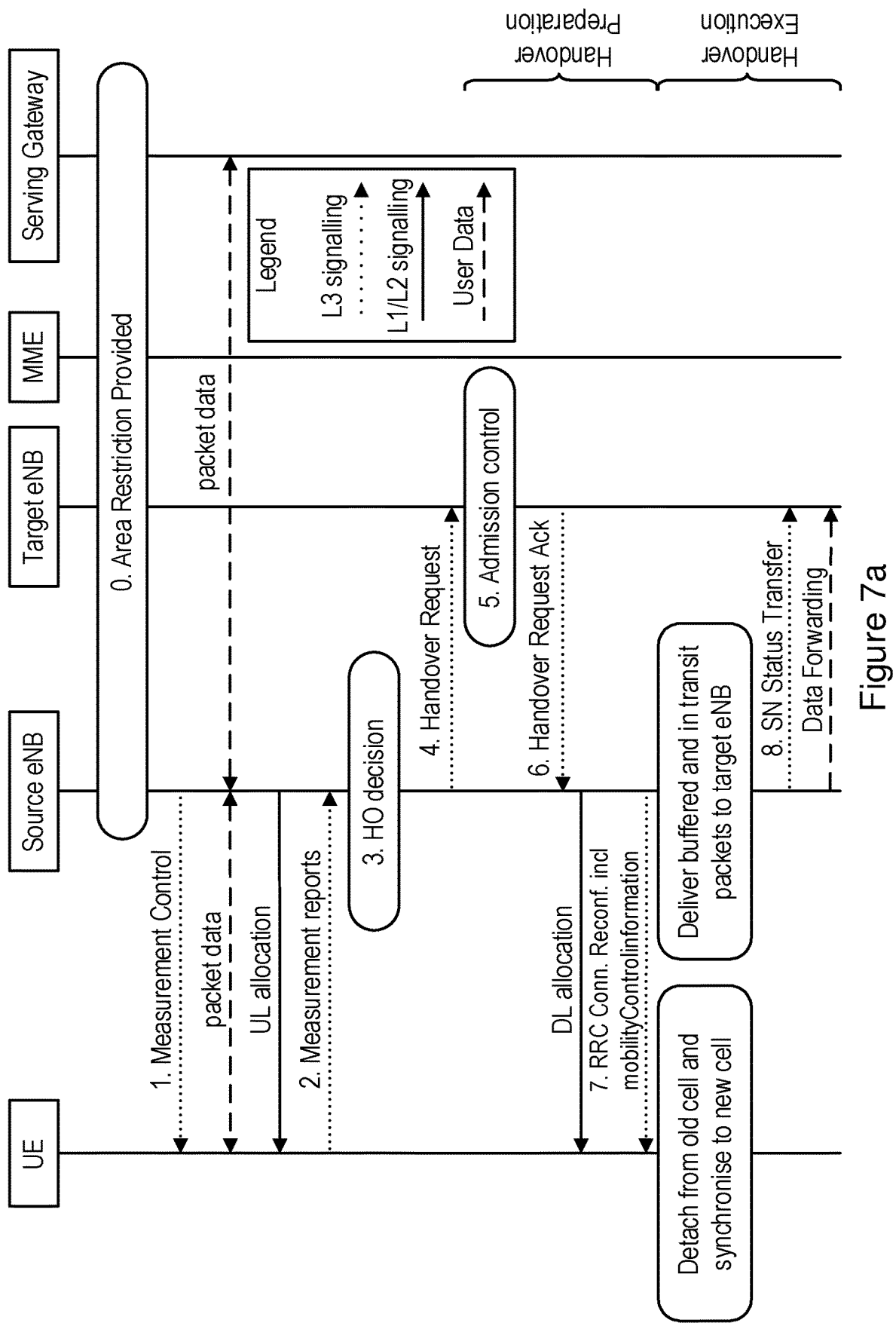
FIG. 7a and FIG. 7b illustrate signalling in the network of FIG. 1.
Figure 7B:
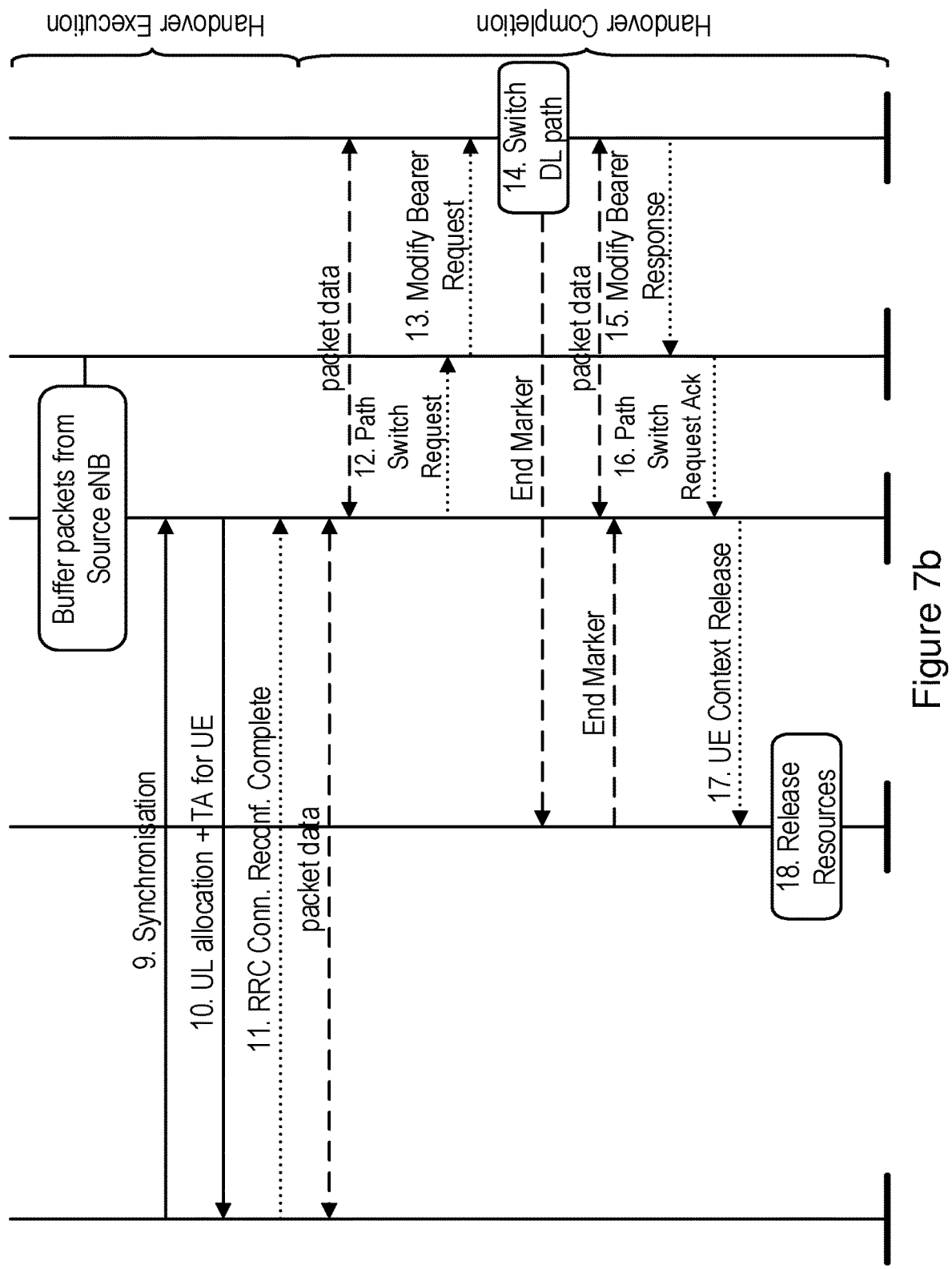
Figure 8:
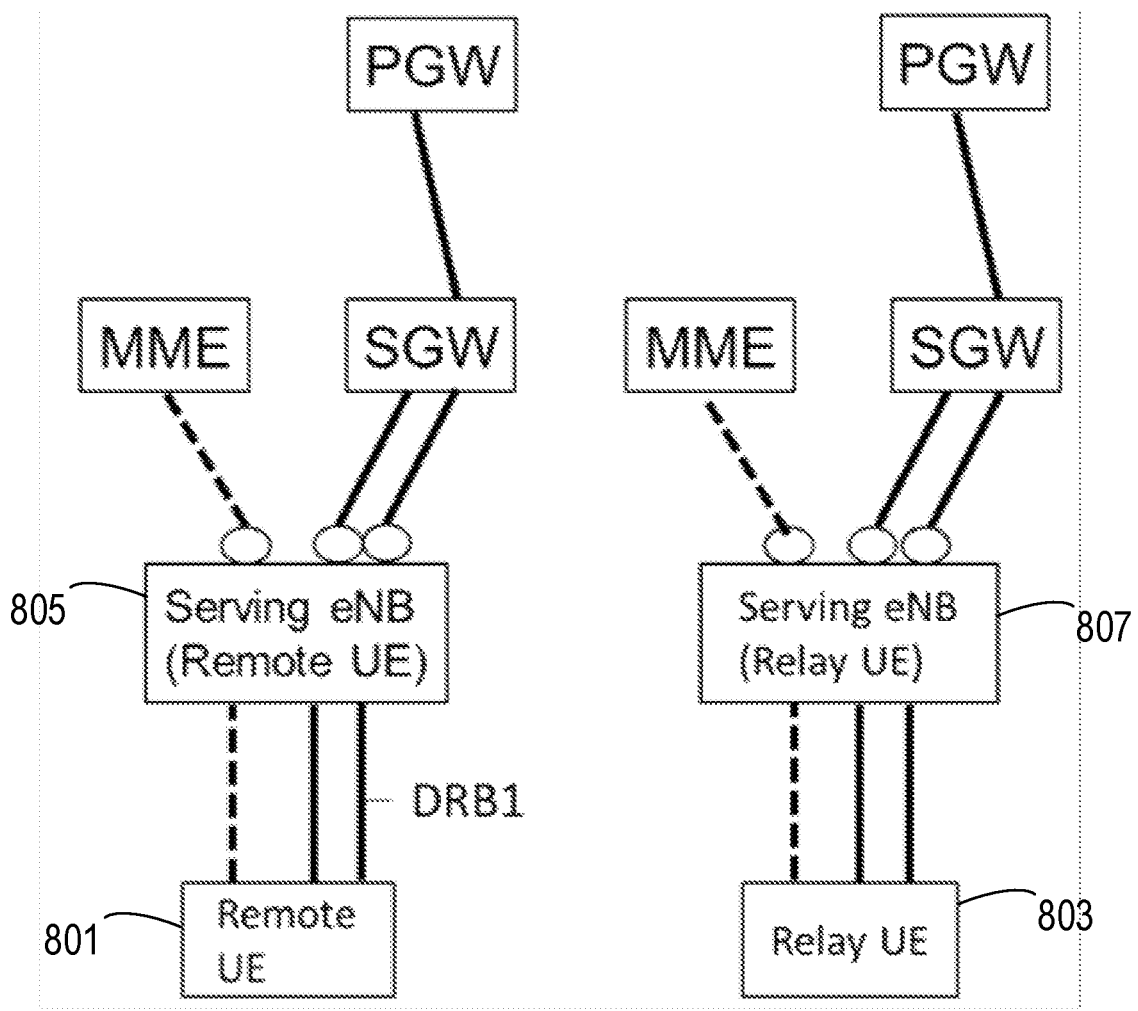
FIG. 8 illustrates connections in a network.
Figure 9:
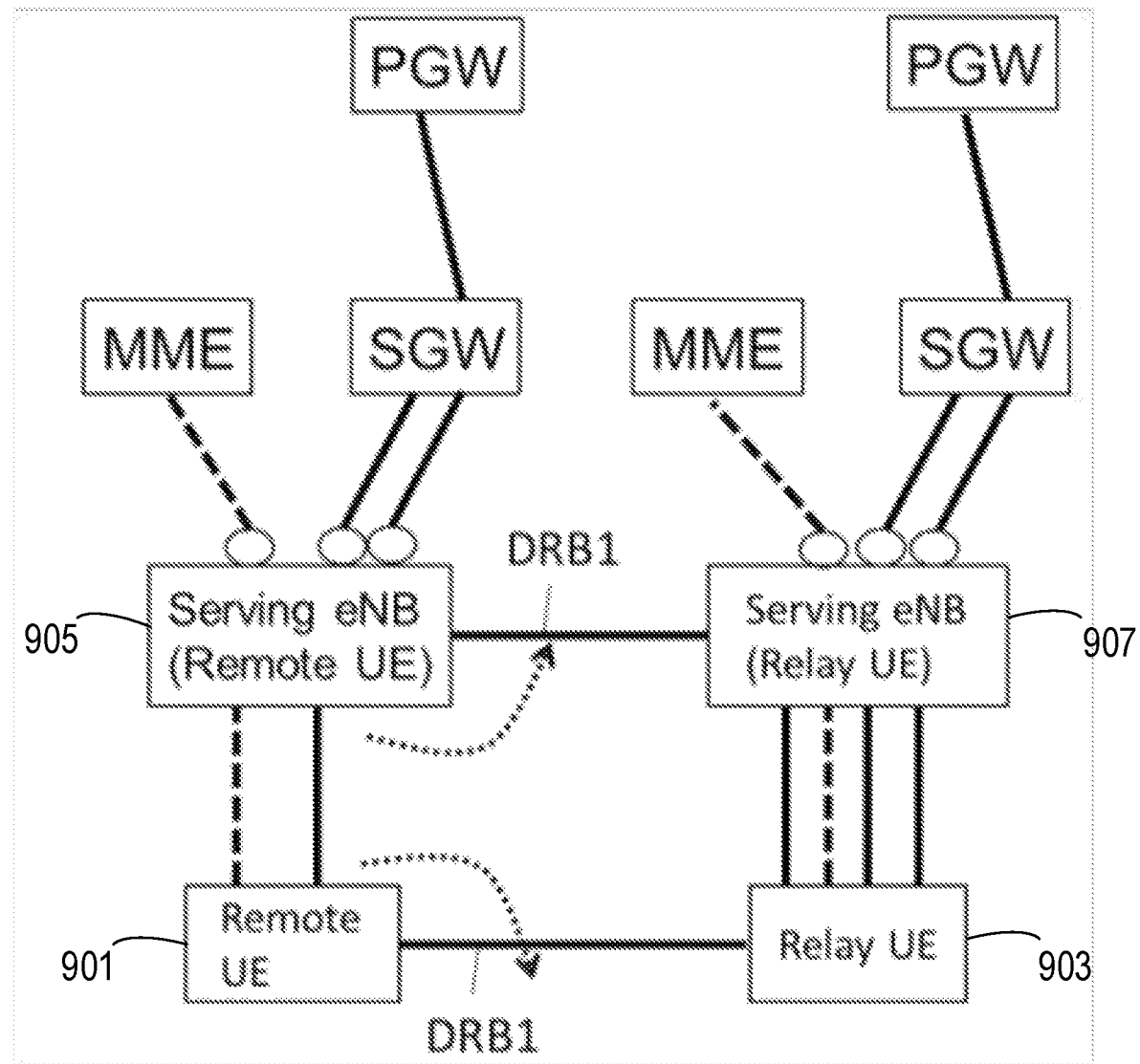
FIG. 9 illustrates connections in a network.

At 1506, standard handover procedures are performed. Thus, the Relay UE is handed over from eNB(Relay UE) to eNB(Remote UE) using standard procedures (as shown in FIG. 7).

At 1507, the Relay UE is now served by eNB(Remote UE). All context to eNB(Relay UE) are now released and both Remote UE and Relay UE are served by the same eNB (namely eNB(Remote UE)).

At 1508, eNB(Relay UE) makes a new decision to use the Relay UE as a relay.

At step 1509, the normal procedure for activating relaying is performed, as described with reference to step 1203 above.

In the second mode of the invention, the objective is that two UEs already participating in relaying, served by the same or different eNBs, can be continued to be served by the same eNB or be handled independently even during mobility of the UEs. This is accomplished by taking actions for the remote UE when a handover is triggered for the relay UE (or vice versa). This mode thus attempts to solves the second problem above.

This situation arises when a Remote UE is connected to a Relay UE, and a handover e.g. due to mobility, is imminent for the relay UE. The handover can be triggered by periodic or event based measurement reports where a neighboring cell has a sufficiently better signal than the serving cell, or the handover can be triggered by another metric such as load balancing or any other network related configuration. In this case there are several options for what the network shall do with the UEs:—

Option 1. The Remote UE context is maintained in the same eNB as before when the Relay UE context is moved to a target eNB. The relayed bearers can be:
  a. Reconfigured to be relayed through a target eNB (same as or different from the target eNB of the relay UE)
  b. Released and the relaying is stopped
  c. Put on hold until the Remote UE context is moved to a target eNB (same as or different from the target eNB of the relay UE).

Option 2. The Remote UE context is transferred to the same target eNB together with the Relay UE context and the relayed bearers are reconfigured.

Option 3. The Remote UE context is transferred to a different target eNB than the target eNB of the Relay UE context and the relayed bearers are reconfigured.

Option 4. Neither the relay UE context nor remote UE context are transferred. In both the first and second mode of the invention, the radio access network (for example the eNBs) needs to decide if, when, and which UE should be handed over to a neighboring eNB in order to better support relaying. Several aspects of the evaluation criteria are common between the first and the second mode while a few of the criteria differ.

One evaluation criterion is whether the Remote UE and the Relay UE are served by the same eNB.

For the first mode,
i. if the Remote UE and the Relay UE are served by the same eNB, the relaying is setup using normal procedures,
ii. if the Remote UE and the Relay UE are served by different eNBs, the eNBs need to decide if any UE should be handed over before initiating relaying or if relaying is possible between different eNBs.

For the second mode,
i. if the Remote UE and the Relay UE are served by the same eNB, the eNB must evaluate whether any/both UEs should be handed over to a target eNB during mobility.
ii. If the Remote UE and the Relay UE are served by different eNB, the eNBs must evaluate if the target eNB can still support relaying with the other UE's source eNB. If not, the eNBs need to decide whether the UE should be handed over and the relaying should stop, or if the other UE should also be handed over to another eNB.

Further evaluation criteria arise when the Remote UE (or the Relay UE) detects a better neighbor cell/eNB to handover to. Evaluation criteria then include:
a. Does the other UE, i.e. the Relay UE (or the Remote UE) have a sufficiently good connection to that cell?
b. Can the target eNB(Remote UE) (or the target eNB(Relay UE)) accept both UEs and support relaying?
c. Is the X2 latency between the target eNB(Remote UE) and the source eNB(Relay UE) (or between the target eNB (Relay UE) and the source eNB(Remote UE)) sufficiently low?
d. Is there another target eNB(Relay UE) (or target eNB (Remote UE)), which also supports relaying, with a sufficiently low X2 latency to the target eNB(Remote UE) (or the target eNB(Relay UE))?

Further evaluation criteria arise when considering whether the Remote UE and the Relay UE have a configured L2 sidelink.

For the first mode of the invention,
it is considered whether a previous L2 sidelink can be resumed via the Relay UE.

For the second mode of the invention,
the quality of the sidelink is assessed, and it is determined whether it is improving or degrading due to mobility.

Further evaluation criteria are based on the position and mobility of the Remote UE and the Relay UE e.g. from GPS or 3GPP positioning.

Figure 24:
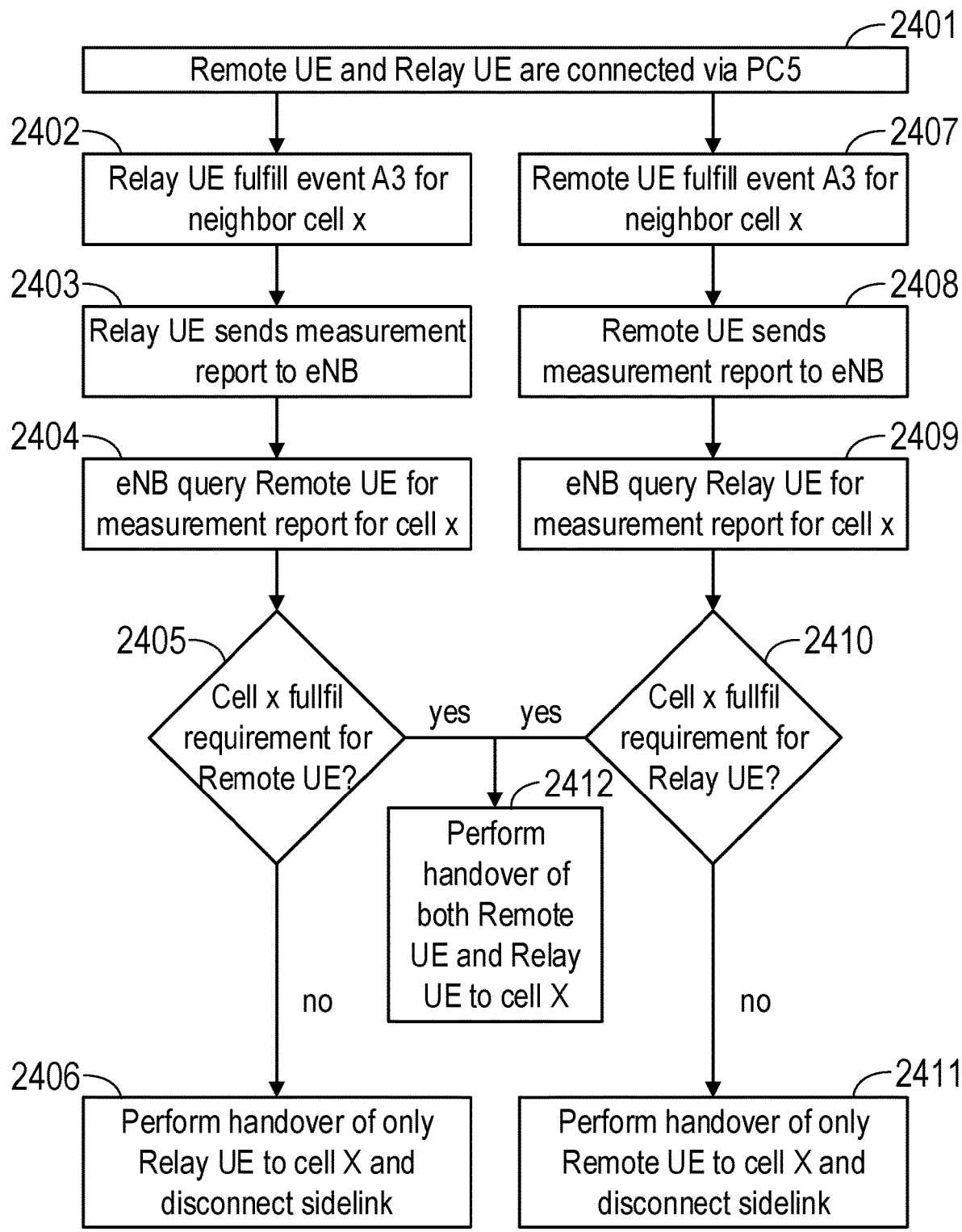
FIG. 24 illustrates a part of a method performed in a network.

FIG. 24 is a flow chart illustrating a possible form of the procedure for identifying a target cell, and determining which UE to handover to the target cell.

At the start of the process in step 2401, the Remote UE and the Relay UE are connected via PC5.

In step 2402, the Relay UE fulfils handover event A3 for a specific neighbour cell, referred to as cell X. The Relay UE then sends a measurement report to its serving eNB at step 2403. In response, at step 2404, the eNB queries the Remote UE for a measurement report for cell X.

In step 2405, it is determined based on this measurement report whether Cell X fulfils the requirement for the Remote UE. If it does not, the process passes to step 2406, and a handover to Cell X is performed for the Relay UE only, and the sidelink between the Remote UE and the Relay UE is disconnected.

The process can also proceed if, in step 2407, the Remote UE fulfils handover event A3 for the specific neighbour cell, cell X. The Remote UE then sends a measurement report to the eNB at step 2408. In response, at step 2407, the eNB queries the Relay UE for a measurement report for cell X.

In step 2410, it is determined based on this measurement report whether Cell X fulfils the requirement for the Relay UE. If it does not, the process passes to step 2411, and a handover to Cell X is performed for the Remote UE only, and the sidelink between the Remote UE and the Relay UE is disconnected.

If it is determined, either in step 2405 or in step 2410, that Cell X fulfils the handover requirement for both the Remote UE and the Relay UE, then, in step 2412, both the Remote UE and the Relay UE are handed over to Cell X.

In the third mode of the invention, the objective is for the Remote UE to connect to a Relay UE other than the one it is currently connected to (i.e. a "handover" from Relay UE1 to Relay UE2). This will trigger a combined switch of the relaying with a handover from one eNB to another eNB (typically the serving eNB of Relay UE2).

Figure 16:
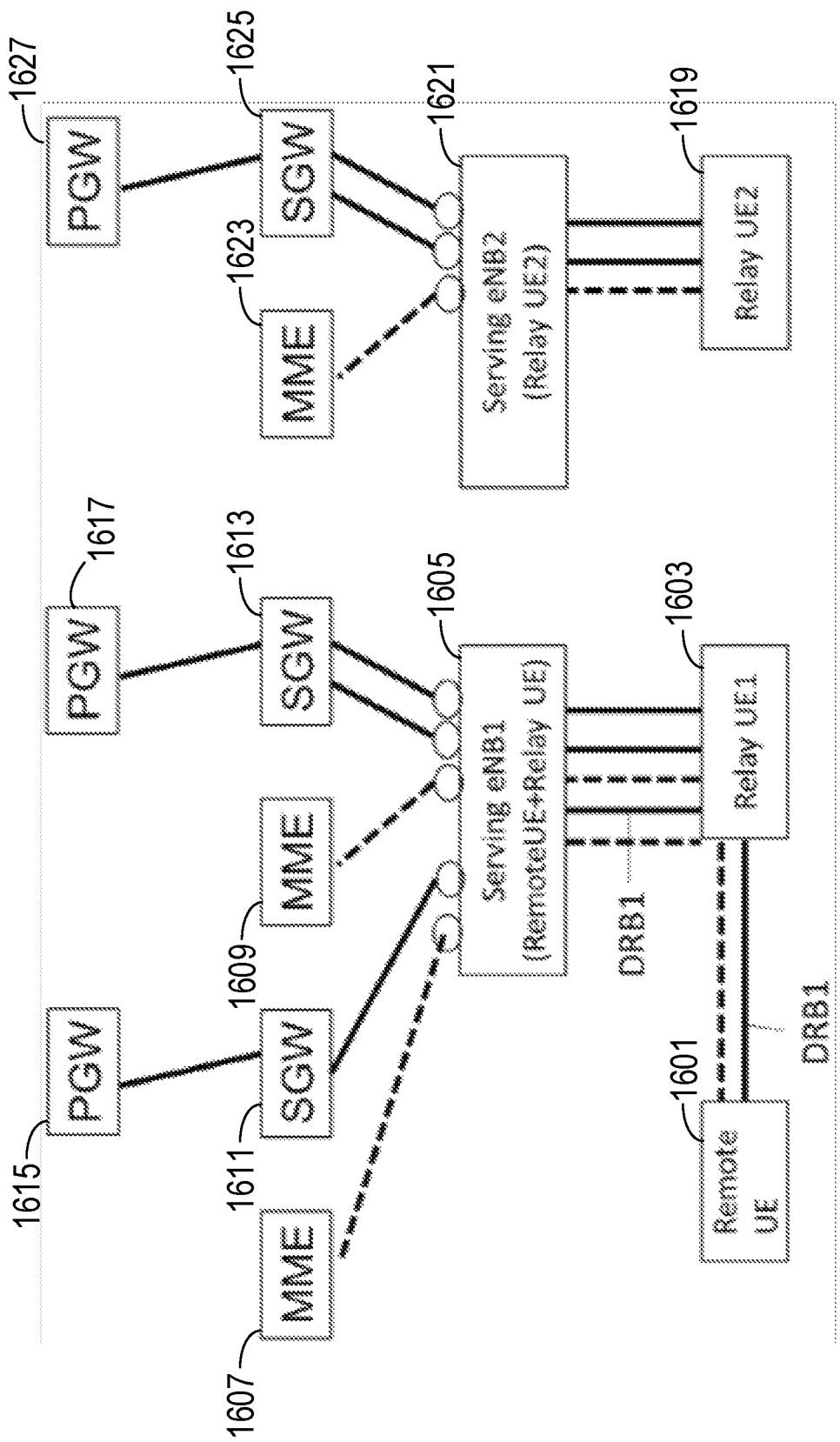
FIG. 16 illustrates connections in a network.

FIG. 16 shows the scenario before the third mode of the invention is carried out. Specifically, FIG. 16 illustrates a situation, in which the remote UE 1601 and the serving relay UE 1603 are served by the same eNB 1605 (which may, however, have connections to separate respective core network nodes such as the Mobility Management Entity (MME) 1607, 1609; Serving Gateway (S-GW) 1611, 1613; and Packet Gateway (P-GW) 1615, 1617 for the remote UE 1601 and the relay UE 1603. At the same time, a further UE 1619 is served by a different eNB 1621, which has connections to core network nodes such as the Mobility Management Entity (MME) 1623; Serving Gateway (S-GW) 1625; and Packet Gateway (P-GW) 1627 for the UE 1619. The Remote UE 1601 connects to this further UE 1619 and uses it as a new relay, Relay UE2.

Figure 17:
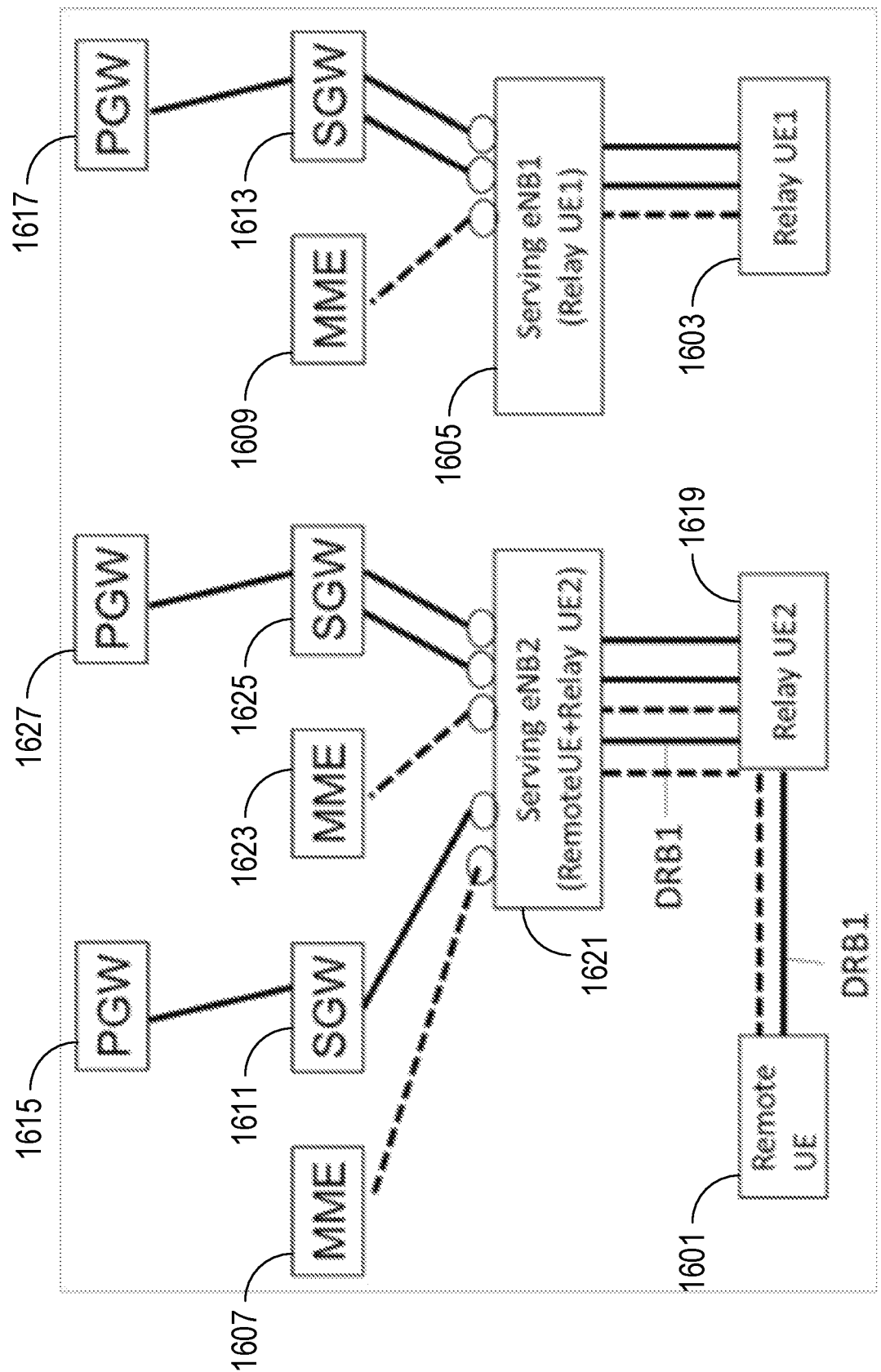
FIG. 17 illustrates connections in a network.

FIG. 17 shows the relaying scenario after the third mode has been activated. Specifically, FIG. 17 illustrates a situation, in which the remote UE 1601 and the new relay UE2 1619 are now served by the eNB 1621 that previously served the UE 1619 (and that may still have connections to separate respective core network nodes such as the Mobility Management Entity (MME) 1607, 1623; Serving Gateway (S-GW) 1611, 1625; and Packet Gateway (P-GW) 1615, 1627 for the remote UE 1601 and the new relay UE2 1619.

Now, the original relay UE, Relay UE1, 1603 is still served by the eNB 1605, which has connections to core network nodes such as the Mobility Management Entity (MME) 1609; Serving Gateway (S-GW) 1613; and Packet Gateway (P-GW) 1617 for the UE 1603.

Figure 18:
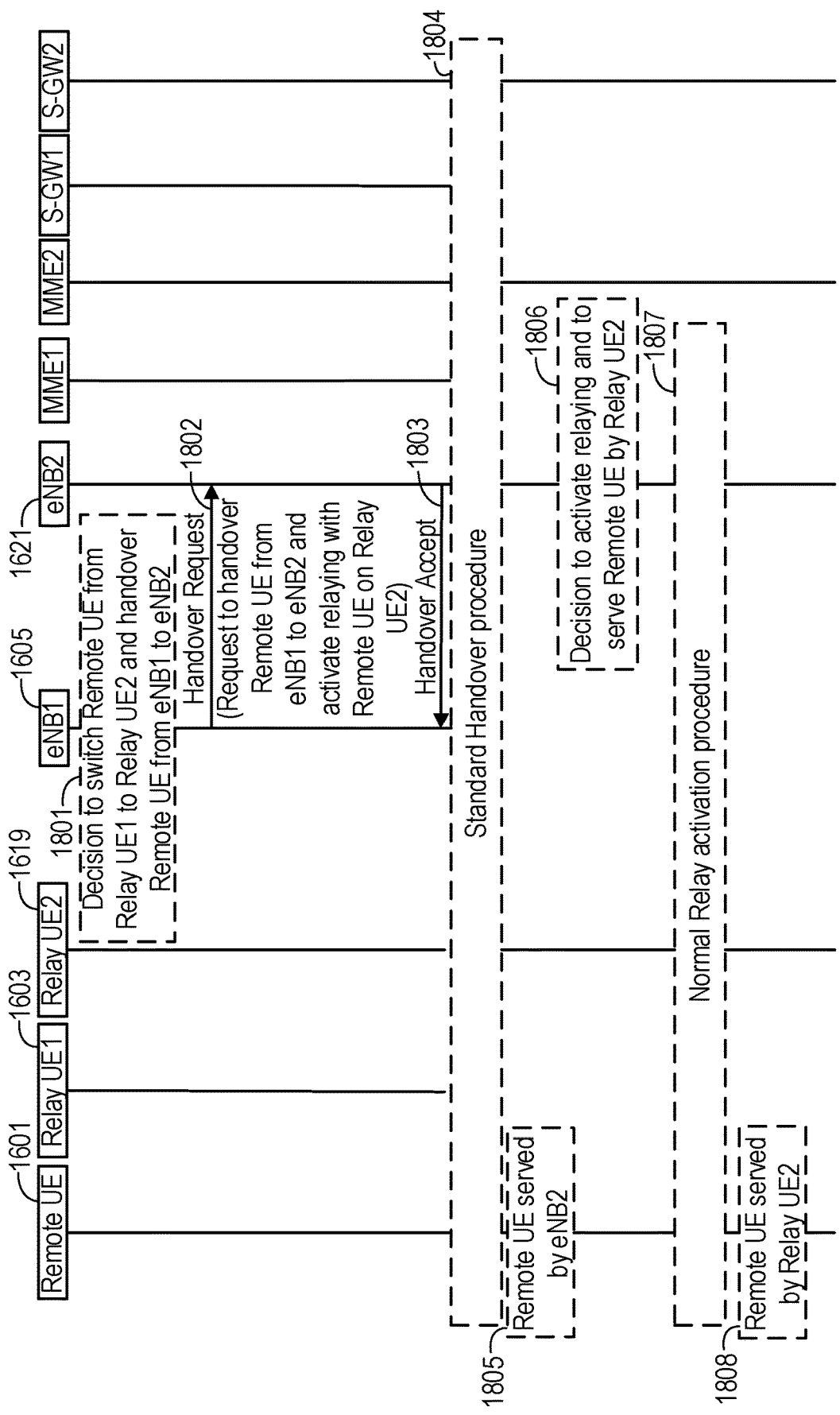
FIG. 18 illustrates signalling in a network.

Thus, the Remote UE 1601 has switched to Relay UE2 1619 and its serving eNB 1621. The signaling procedure is shown in FIG. 18.

In step 1801, the eNB serving the original Relay UE (eNB1) makes a decision to switch the Remote UE from Relay UE1 to Relay UE2, and to handover the Remote UE from eNB1 to the eNB serving Relay UE2 (eNB2). This decision in eNB1 can be made based on one or more triggers such as:

a measurement report from the Remote UE indicating that the signal strength of Relay UE2 is above a threshold;

a measurement report from the Remote UE indicating that the signal strength of Relay UE2 is offset higher than the signal strength of Relay UE1;

a measurement report from the Remote UE indicating that the signal strength of eNB2 is offset higher than the signal strength of eNB1;

a measurement report from the Remote UE indicating that the signal strength of Relay UE1 is below a threshold;

a measurement report from the Relay UE1 indicating that the signal strength of Remote UE is below a threshold;

a measurement report from the Relay UE2 indicating that the signal strength of Remote UE is above a threshold;

an indication from Relay UE1 that it is no longer interested in doing relaying.

The triggers may also be combined in any way.

In step 1802, eNB1 sends a handover request to eNB2, requesting to handover the Remote UE from eNB1 to eNB2 and to activate relaying with the Remote UE on Relay UE2. The handover request message 2 may contain an identifier (Relay UE2 ID) of Relay UE2.

In step 1803, eNB2 sends a handover accept message to eNB1.

Upon eNB1 receiving the Handover Accept message, a standard handover procedure is triggered, as shown at 1804. As part of this procedure eNB1 also needs to deactivate the relaying of Remote UE via Relay UE1. It may also deactivate Relay UE1 upon completion.

At 1805, the Remote UE is served by eNB2. At step 1806, eNB2 makes a decision to activate relaying, and to serve the Remote UE by Relay UE2. A normal relay activation procedure is therefore performed in step 1807. At 1808, the Remote UE is now served by the Relay UE2. These steps can also be part of an optimized handover procedure, where the Remote UE is handed over directly from Relay UE1 to Relay UE2 (e.g. without performing random access to eNB2).

In the fourth mode of the invention, the objective is to deactivate the relaying for the Remote UE and combine it with a handover from the serving eNB of the Relay UE to the eNB controlling the target cell. This procedure may be triggered by a measurement report (for example a measurement report indicating that a target cell is stronger than the serving cell of the Relay UE).

Figure 19:
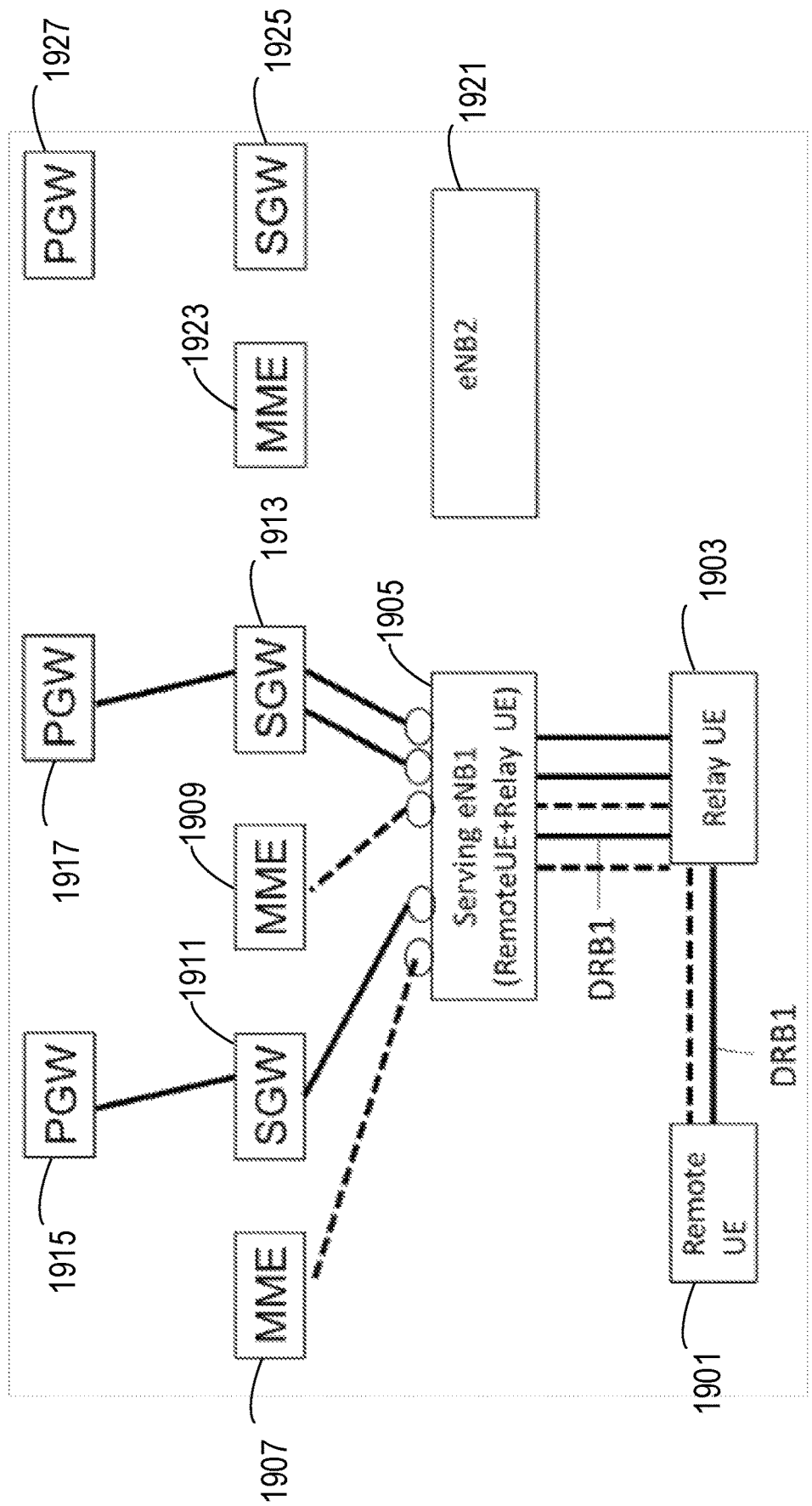
FIG. 19 illustrates connections in a network.

FIG. 19 shows the relaying scenario before the fourth mode of the invention is initiated. Specifically, FIG. 19 illustrates a situation, in which the remote UE 1901 and the serving relay UE 1903 are served by the same eNB 1905 (which may, however, have connections to separate respective core network nodes such as the Mobility Management Entity (MME) 1907, 1909; Serving Gateway (S-GW) 1911, 1913; and Packet Gateway (P-GW) 1915, 1917 for the remote UE 1901 and the relay UE 1903. At the same time, there is a further eNB 1921, which has connections to core network nodes such as the Mobility Management Entity (MME) 1923; Serving Gateway (S-GW) 1925; and Packet Gateway (P-GW) 1927. The Remote UE 1901 hands over to this further eNB 1921, meaning that it can no longer use the Relay UE 1903.

Figure 20:
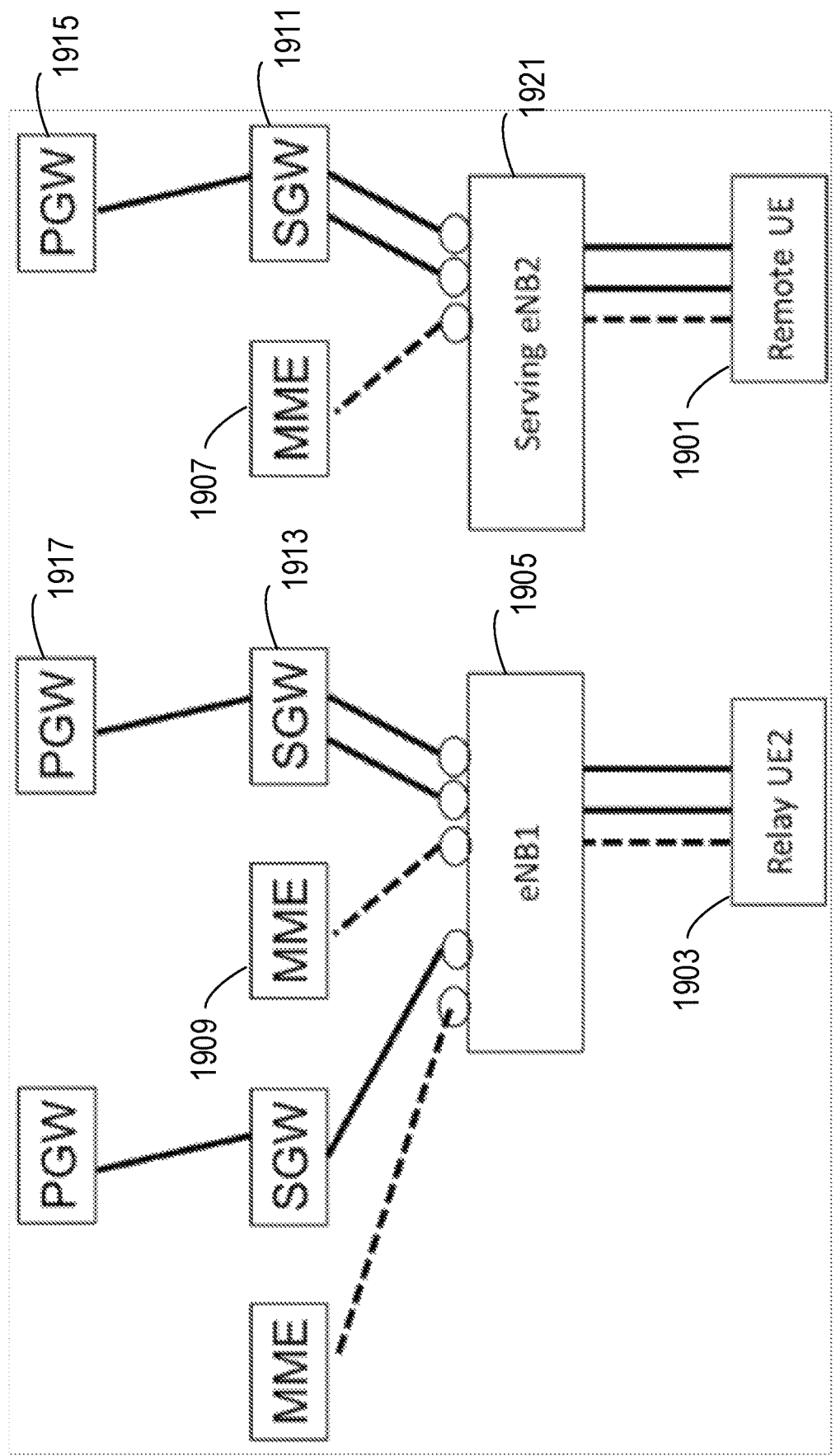
FIG. 20 illustrates connections in a network.
Figure 21:
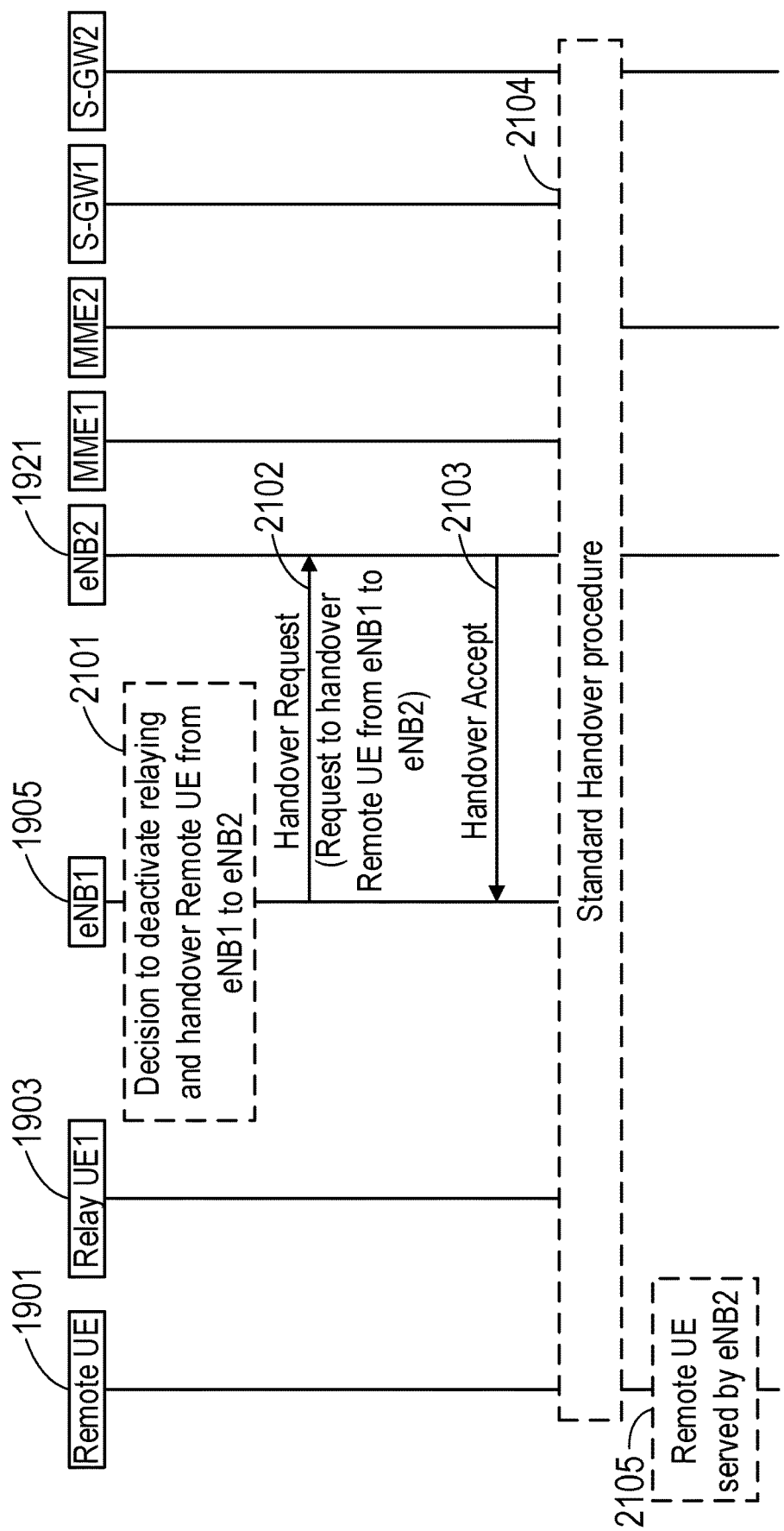
FIG. 21 illustrates signalling in a network.

FIG. 20 shows the scenario after the fourth mode has been activated. Specifically, FIG. 20 illustrates a situation, in which the remote UE 1901 is now served by the eNB 1921, but still uses the same core network nodes, namely the Mobility Management Entity (MME) 1907; Serving Gateway (S-GW) 1911; and Packet Gateway (P-GW) 1915. The original relay UE, Relay UE1, 1903 is still served by the eNB 1905, which has connections to core network nodes such as the Mobility Management Entity (MME) 1909; Serving Gateway (S-GW) 1913; and Packet Gateway (P-GW) 1917 for the UE 1903. Thus, the Remote UE has switched to eNB2. The signaling procedure is shown in FIG. 21.

In step 2101, the eNB serving the original Relay UE (eNB1) makes a decision to deactivate relaying, and to handover the Remote UE from eNB1 to eNB2. This decision in eNB1 can be made based on one or more triggers such as:

a measurement report from the Remote UE indicating that the signal strength of eNB2 is higher by an offset value than the signal strength of eNB1;

a measurement report from the Remote UE indicating that the signal strength of Relay UE1 is below a threshold;

a measurement report from the Remote UE indicating that the signal strength of Relay UE1 is above a threshold;

a measurement report from the Relay UE1 indicating that the signal strength of Remote UE is below a threshold;

an indication from Relay UE1 that it is no longer interested in doing relaying;

a report from the Remote UE (e.g. a Buffer status report) indicating that it has an amount of data to transmit which is higher than a threshold;

information that eNB2 can provide a service that eNB1 cannot (e.g. NB-IoT).

The triggers can also be combined in any way.

In step 2102, eNB1 sends a handover request to eNB2, requesting to handover the Remote UE from eNB1 to eNB2.

In step 2103, eNB2 sends a handover accept message to eNB1.

Upon eNB1 receiving the Handover Accept message, a standard handover procedure is triggered, as shown at 2104. At 2105, the Remote UE is served by eNB2.

In the fifth mode of the invention, a first Remote UE served by eNB1 is connected through a Relay UE served by eNB1. A second Remote UE served by eNB2 is triggered to start relaying and Relay UE is selected as the relay UE. This may cause a handover of one or several of the three involved UEs.

Figure 22:
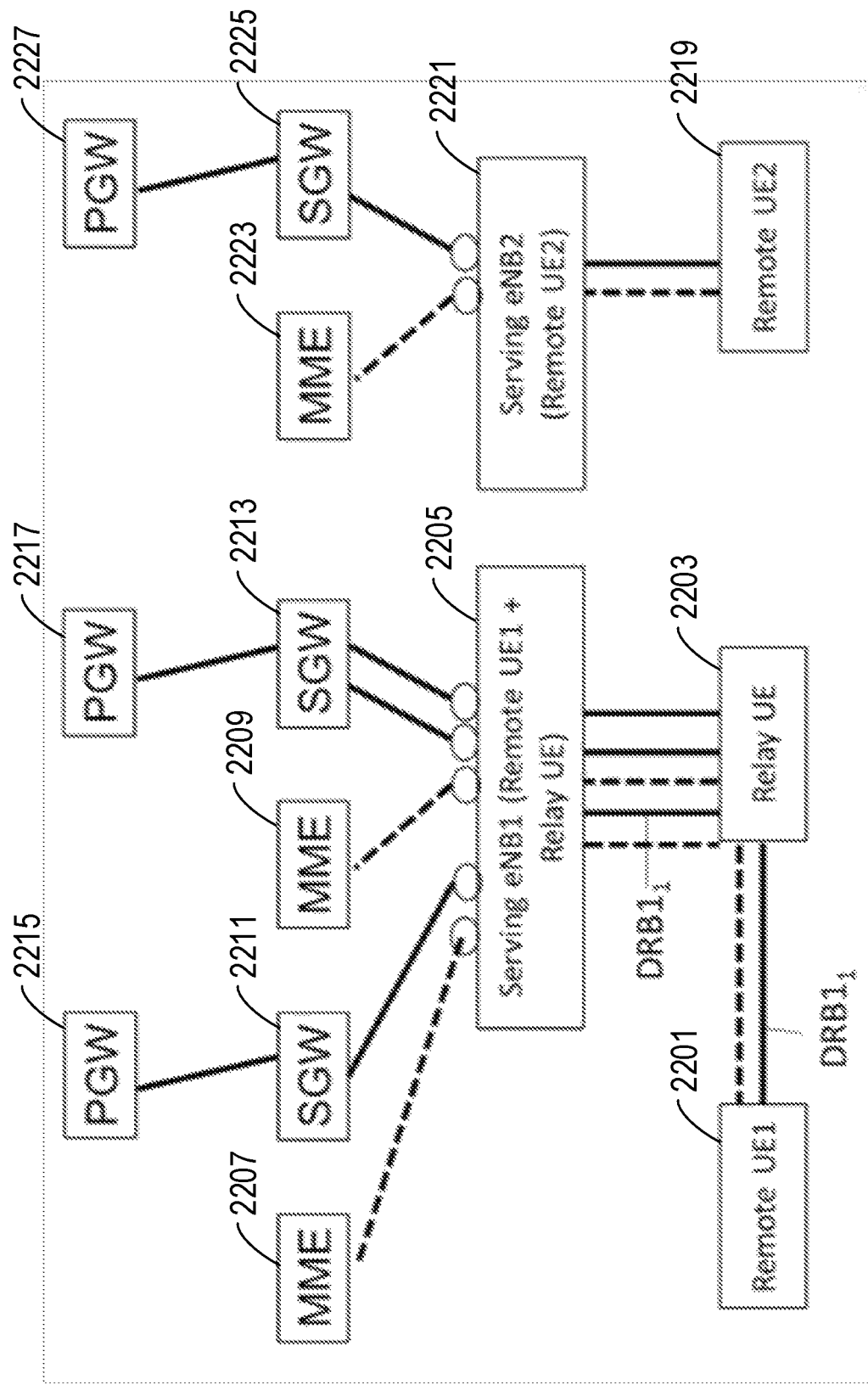
FIG. 22 illustrates connections in a network.

FIG. 22 shows the relaying scenario before the fifth mode of the invention is initiated. Specifically, FIG. 22 illustrates a situation, in which the first remote UE1 2201 and the serving relay UE 2203 are served by the same eNB 2205 (which may, however, have connections to separate respective core network nodes such as the Mobility Management Entity (MME) 2207, 2209; Serving Gateway (S-GW) 2211, 2213; and Packet Gateway (P-GW) 2215, 2217 for the remote UE 2201 and the relay UE 2203. At the same time, a further remote UE2 2219 is served by a different eNB 2221, which has connections to core network nodes such as the Mobility Management Entity (MME) 2223; Serving Gateway (S-GW) 2225; and Packet Gateway (P-GW) 2227 for the UE 2219.

The second Remote UE2 2201 connects to the same relay UE 2203 and is then served by the eNB 2205.

Figure 23:
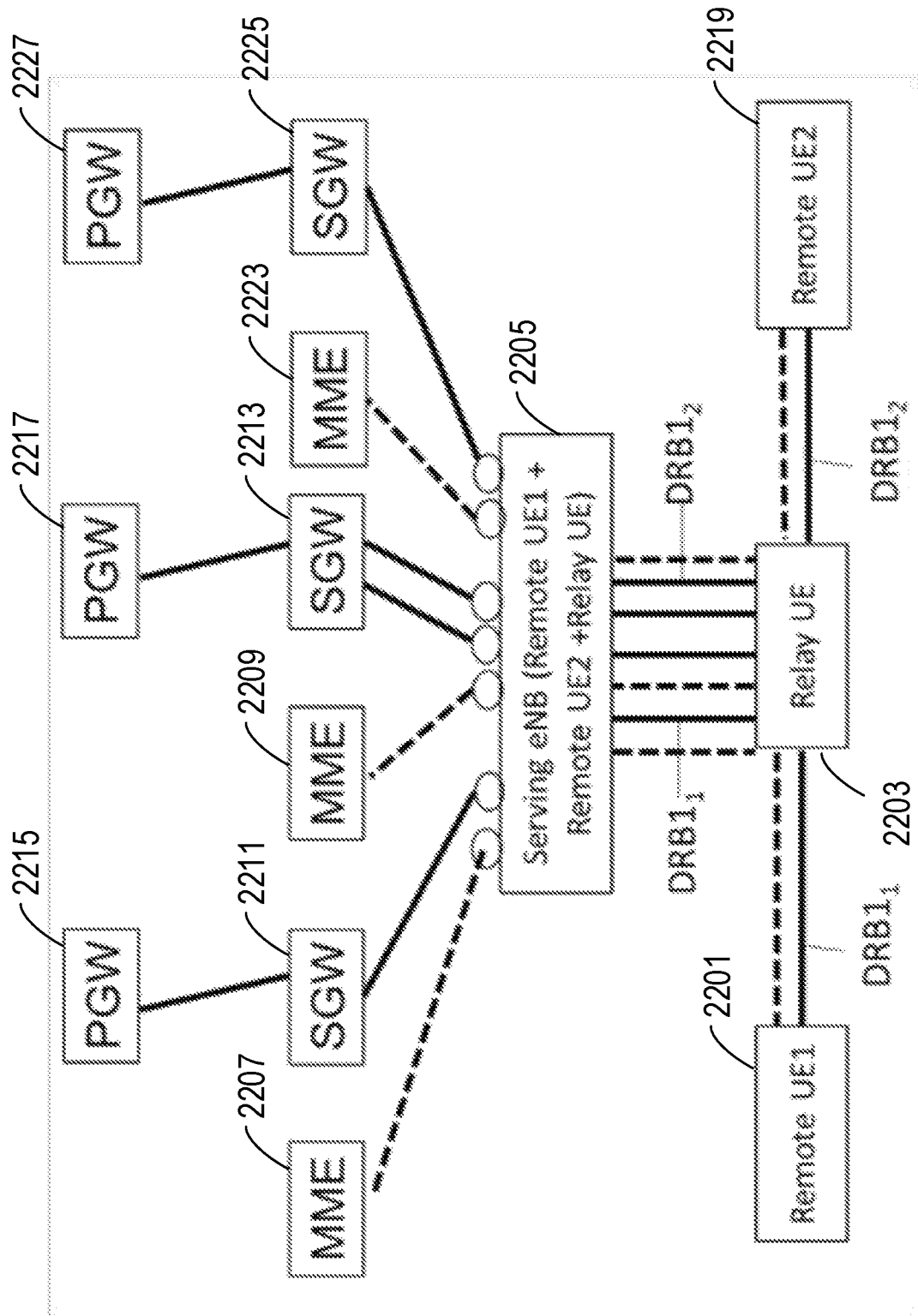
FIG. 23 illustrates connections in a network.

FIG. 23 shows the relaying scenario after the fifth mode has been activated. Specifically, FIG. 23 illustrates a situation, in which the first remote UE1 2201, the second remote UE2 2219 and the relay UE 2203 are all now served by the eNB 2205 (that may now have connections to separate respective core network nodes such as the Mobility Management Entity (MME) 2207, 2209, 2223; Serving Gateway (S-GW) 2211, 2213, 2225; and Packet Gateway (P-GW) 2215, 2217, 2227 for the remote UE 1601, the relay UE2 203 and the second remote UE2 2219.

Thus, Remote UE1 2201 is using the Relay UE 2203 as a relay when Remote UE2 2219 is decided to start relaying with Relay UE 2203. Serving eNB2 2221 (the serving eNB of Remote UE2) would send a handover request with activate relaying to eNB1. eNB1 then has to decide whether to:

Accept Remote UE2 to handover and activate relaying, or
Reject Remote UE2 and instead request to handover Relay UE+Remote UE1 to eNB2.

This evaluation can be based, for example, on some or all of:
coverage of Remote UE1, Remote UE2, and Relay UE at both eNB1 and eNB2;
traffic load at eNB1 and eNB2;
capabilities of eNB1 and eNB2; and
ongoing relaying traffic of Remote UE1.

In the sixth mode of the invention, the objective is to ensure that a remote UE and relay UE, are served by the same eNBs. This is accomplished by selecting a relay UE which is served by the same eNB as the remote UE. This mode thus solves the first problem above. This mode can be used as part of any of the other modes described above, given that the identification of UEs that are served by a particular eNB can be used in any of these modes.

In this mode, information that is used to determine which eNB serves a UE (either a remote UE or a relay UE), is used as part of the relay discovery and/or selection procedure.

There are two different main alternative solutions described here.

In the first main alternative solution, the serving cell ID is transmitted over the sidelink either during or after the discovery procedure. This cell ID is then used to determine how the serving eNBs of the two UEs are related. There are two options for this first main alternative solution:

1. The first option is typically used for discovery model B. Here the remote UE includes the identity of its current serving cell in the discovery announcement message used to inform candidate relay UEs of its interest to use relaying. This information is used in the relay UE selection, for example by the relay UE. For example, when receiving the discovery announcement from the remote UE, the relay UE compares the identity of the remote UE's serving cell with the identity of its own serving cell. If the received cell identity matches the identity of its own serving cell, the relay UE responds. Or, as an alternative, the cell identity is used to determine which eNB serves the UE. For example, a first part of the cell identity comprises the eNB identity.

2. The second option is typically used for discovery model A, Here the relay UE includes the identity of its currently serving cell in the transmitted discovery announcement message. This information is used in the relay UE selection, for example by the remote UE. For example, when receiving the discovery announcement from the relay UE, the remote UE compares the identity of the relay UE's serving cell with the identity of its own serving cell. If the received cell identity matches the identity of its own serving cell, the remote UE responds.

In the second main alternative solution, a temporary UE ID is transmitted over the sidelink during or after the discovery procedure. This UE ID is then used to determine how the serving eNBs of the two UEs are related. There are two options for this second main alternative selection:

1. The first option is typically used for discovery model B. The remote UE includes a UE ID (e.g. S-TMSI, Resume Identity or another temporary UE ID) in the discovery announcement message. The identity may have been allocated by a network node, for example an eNB, and specifically the eNB that is serving the Remote UE. After receiving the discovery announcement from the remote UE, the relay UE transmits this UE ID to its serving eNB. This eNB uses the UE ID to determine the eNB that is serving the Remote UE. In some cases, such as when the UE ID is allocated by the core network (which is the case with S-TMSI), the eNB needs to request the MME to determine the serving eNB of the remote UE. In one example, a part of the UE ID is used to determine the serving eNB, for example a first part corresponding to an eNB identity used for table lookup, or DNS lookup of which eNB that serves the remote UE. If the serving eNB of the remote UE is the same eNB that currently serves the relay UE, the eNB responds back to the relay UE, including information (such as a boolean flag) that triggers the relay UE to respond to the remote UE.

2. The second option is typically used for discovery model A. The relay UE includes a UE ID (e.g. S-TMSI) in the transmitted discovery announcement message. Again, the temporary identity may have been allocated by a network node, for example an eNB, and specifically the eNB that is serving the Remote UE. After receiving the discovery announcement from the relay UE, the remote UE transmits this UE ID to its serving eNB. This eNB uses the UE ID to determine the eNB that is serving the relay UE. In some cases, such as when the UE ID is allocated by the core network (which is the case with S-TMSI), the eNB needs to request the MME to determine the serving eNB of the relay UE. In one example, a part of the UE ID is used to determine the serving eNB, for example a first part corresponding to an eNB identity used for table lookup, or DNS lookup of which eNB that serves the relay UE. If the serving eNB of the relay UE is the same eNB that currently serves the remote UE, the eNB responds back to the remote UE, including information (such as a boolean flag) that triggers the remote UE to respond to the relay UE.

In the second main alternative solution, for both options, if the two UEs have previously been involved in UE-to-Network Relaying, but have disconnected, the eNB may retain a list of which eNB other UEs used.

Moreover, the UE (remote UE or relay UE) may use the UE ID received in the discovery announcement and determine whether the other UE (relay UE or remote UE) is served by the same eNB as itself. For example, if a first part of the UE ID identifies the serving eNB, the UE may compare the first part of the received UE ID with the first part of its own UE ID. If there is a match, the other UE is served by the same eNB as itself.

Figure 25:
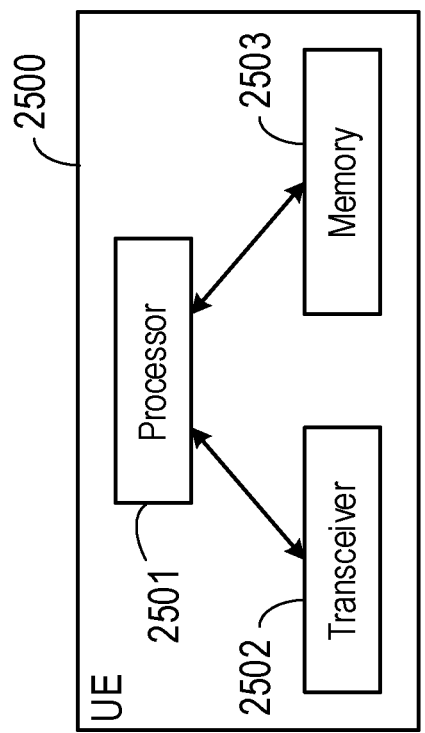
FIG. 25 shows a user equipment for use in aspects of the invention.

FIG. 25 shows a user equipment 2500 that can be adapted or configured to operate according to one or more of the non-limiting example embodiments described, either as a remote UE or as a relay UE as described herein. Of course, a single UE will typically be able to act as a remote UE or as a relay UE, as the circumstances dictate. The UE 2500 comprises a processor or processing unit 2501 that controls the operation of the device 2500. The processor 2501 is connected to a transceiver 2502 (which comprises a receiver and a transmitter) with associated antenna(s) and is used to transmit signals to and receive signals from nodes in the network or from other UEs. The UE 2500 also comprises a memory or memory unit 2503 that is connected to the processor 2501 and that contains instructions or computer code executable by the processor 2501 and other information or data required for the operation of the UE 2500 in accordance with the methods described herein.

Figure 26:
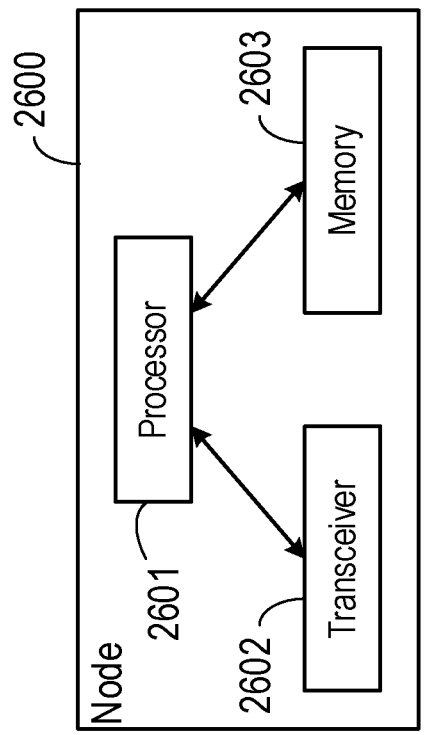
FIG. 26 shows a radio access node for use in aspects of the invention.

FIG. 26 shows a radio access node, for example an eNB 2600 that can be adapted or configured to operate according to one or more of the non-limiting example embodiments described. The illustrated radio access node may serve either a remote UE or a relay UE as described herein. Of course, a single radio access node will typically be able to serve many UEs simultaneously, and one or more of these UEs may be acting as a remote UE while one or more other UE is acting as a relay UE, as the circumstances dictate. The eNB 2600 comprises a processor or processing unit 2601 that controls the operation of the device 2600. The processor 2601 is connected to a transceiver 2602 (which comprises a receiver and a transmitter) with associated antenna(s) and network interfaces, and is used to transmit signals to and receive signals from other nodes in the network or from UEs. The eNB 2600 also comprises a memory or memory unit 2603 that is connected to the processor 2601 and that contains instructions or computer code executable by the processor 2601 and other information or data required for the operation of the eNB 2600 in accordance with the methods described herein.

Figure 27:
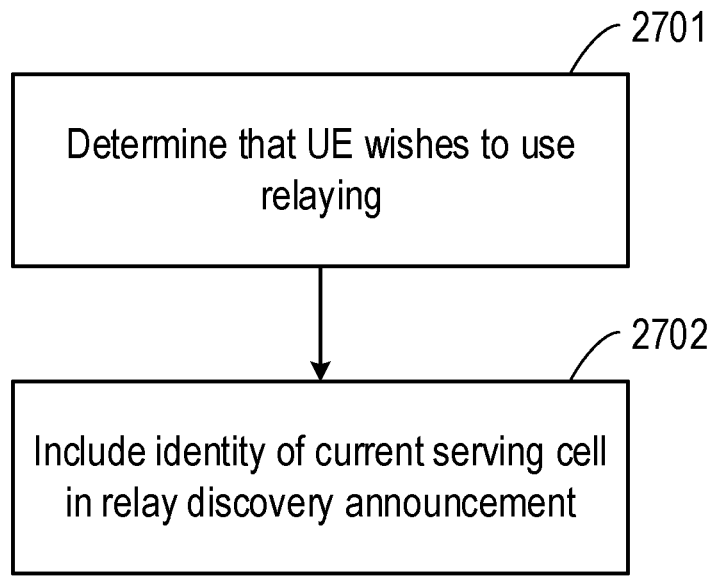
FIG. 27 illustrates a part of a method performed in a network.

FIG. 27 shows a method of operation of a first user equipment, UE. Thus, at step 2701, the UE determines that it wishes to use relaying. Then, at step 2702, it includes an identity of its current serving cell in a relay discovery announcement.

Figure 28:
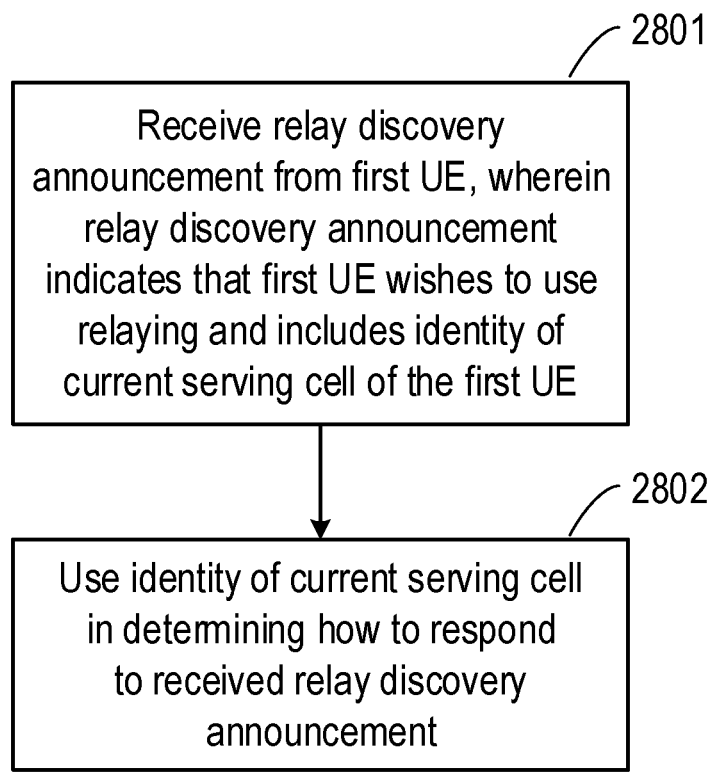
FIG. 28 illustrates a part of a method performed in a network.

FIG. 28 shows a method of operation of a second user equipment, UE. At step 2801, the second UE receives a relay discovery announcement from a first UE, wherein the relay discovery announcement indicates that the first UE wishes to use relaying and includes an identity of a current serving cell of the first UE. At step 2802, the second UE uses the identity of the current serving cell of the first UE in determining how to respond to the received relay discovery announcement.

Figure 29:
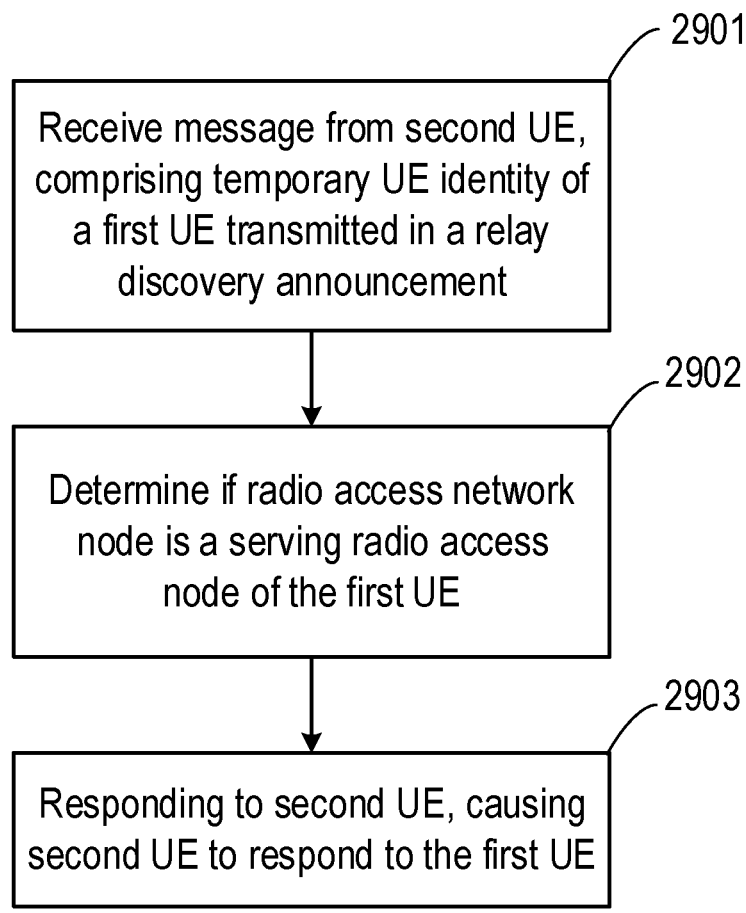
FIG. 29 illustrates a part of a method performed in a network.

FIG. 29 shows a method of operation of a radio access network node serving a second user equipment, UE. At step 2901, the radio access network node receives a message from the second UE, the message comprising a temporary UE identity of a first UE transmitted by the first UE in a relay discovery announcement, wherein the relay discovery announcement indicates that the first UE wishes to use relaying. At step 2902, the radio access network node determines if it is a serving radio access node of the first UE. If so, at step 2903 it responds to the second UE, causing the second UE to respond to the first UE.

Figure 30:
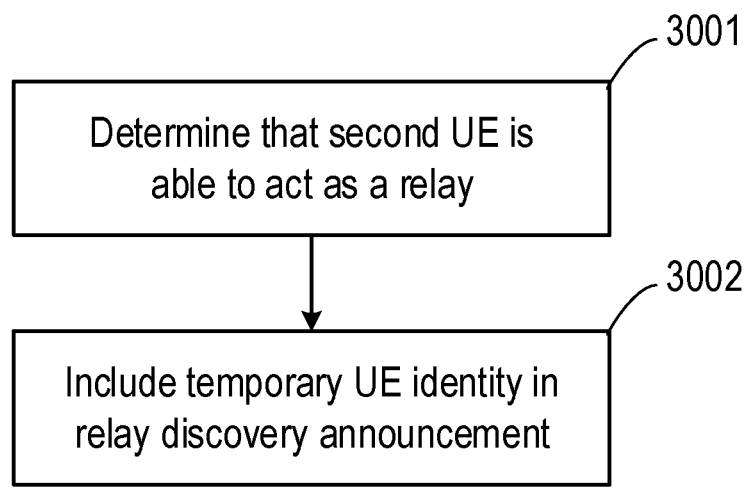
FIG. 30 illustrates a part of a method performed in a network.

FIG. 30 shows a method of operation of a second user equipment, UE. At step 3001, the second UE determines that it is able to act as a relay, and at step 3002 it includes a temporary UE identity in a relay discovery announcement.

Figure 31:
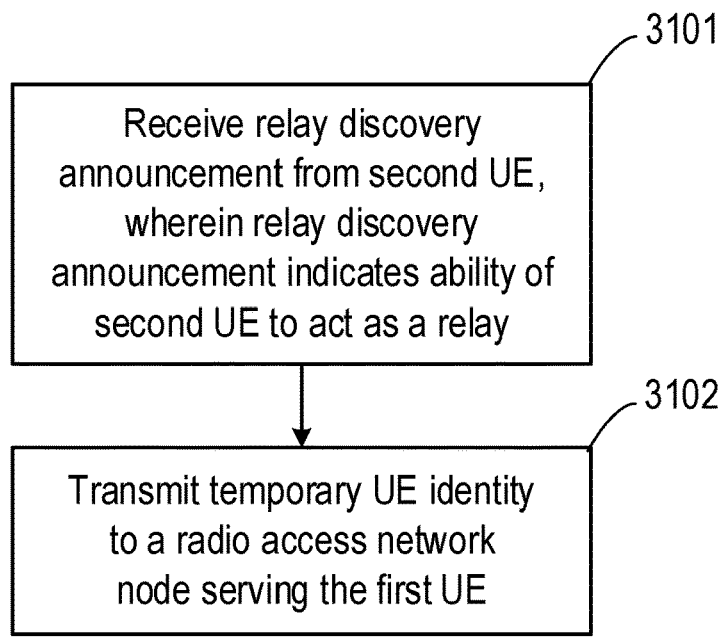
FIG. 31 illustrates a part of a method performed in a network.

FIG. 31 shows a method of operation of a first user equipment, UE. At step 3101, the UE receives a relay discovery announcement from a second UE, wherein the relay discovery announcement indicates an ability of the second UE to act as a relay, and includes a temporary UE identity of the second UE. At step 3102 the UE transmits the temporary UE identity to a radio access network node serving the first UE.

Figure 32:
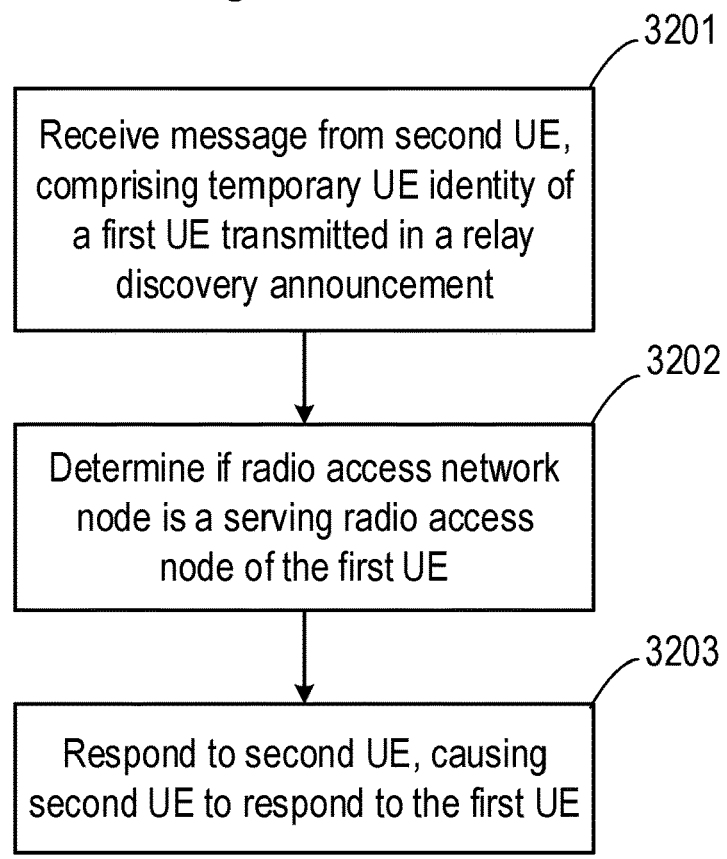
FIG. 32 illustrates a part of a method performed in a network.

FIG. 32 shows a method of operation of a radio access network node serving a first user equipment, UE. At step 3201, the node receives a message from the first UE, the message comprising a temporary UE identity of a second UE transmitted by the second UE in a relay discovery announcement, wherein the relay discovery announcement indicates that the second UE is capable of relaying. At step 3202 the node determines if it is a serving radio access node of the second UE. If so, at step 3203 the node responds to the first UE, causing the first UE to respond to the second UE.

Figure 33:
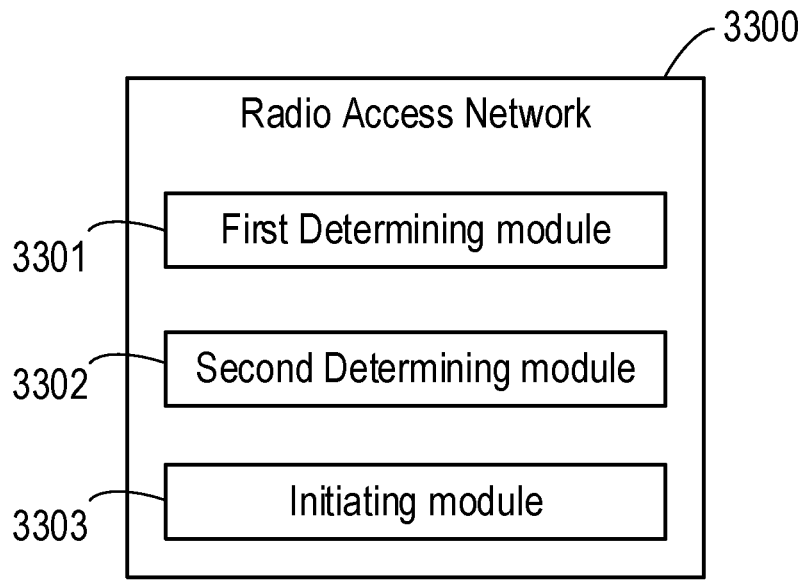
FIG. 33 illustrates a radio access network.

FIG. 33 shows a radio access network 3300 comprising a first radio access node and a second radio access node. The radio access network 3300 comprises a first determining module 3301 for determining that a first user equipment, UE, that is served by the first radio access node should start relaying through a second UE. The radio access network 3300 also comprises a second determining module 3302 for determining whether the second UE is served by the first radio access node. The radio access network 3300 also comprises an initiating module 3303 for, in response to determining that the second UE is served not by the first radio access node but by the second radio access node, initiating a handover such that the first and second UEs are served by the same radio access node.

Figure 34:
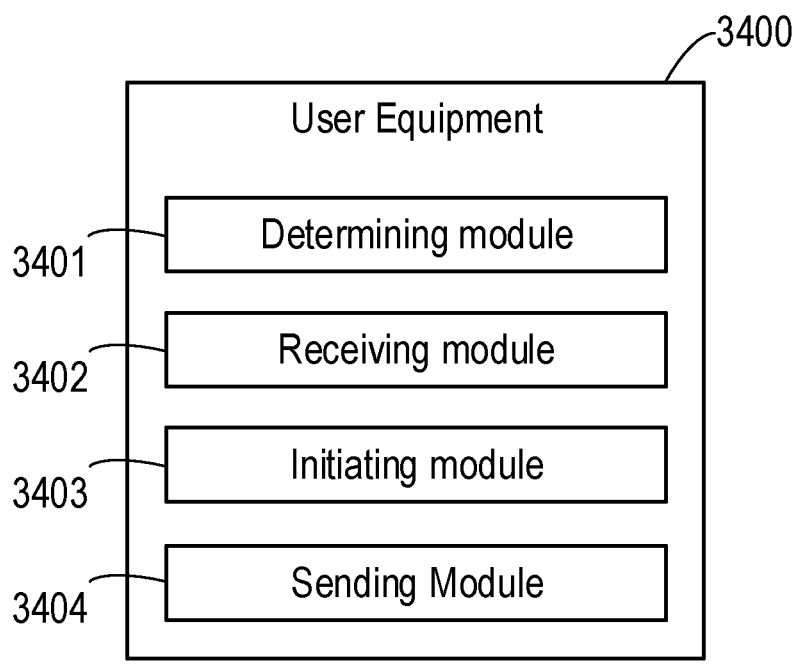
FIG. 34 illustrates a user equipment device.

FIG. 34 shows a user equipment 3400, which comprises: a determining module 3401 for determining to start relaying through a second UE that is served by a second radio access node; a receiving module 3402 for receiving a connection reconfiguration request from the first radio access node; an initiating module 3403 for initiating relaying through the second UE; and a sending module 3404 for sending a response message, confirming that the connection reconfiguration is complete, to the second radio access node through the second UE.

Figure 35:
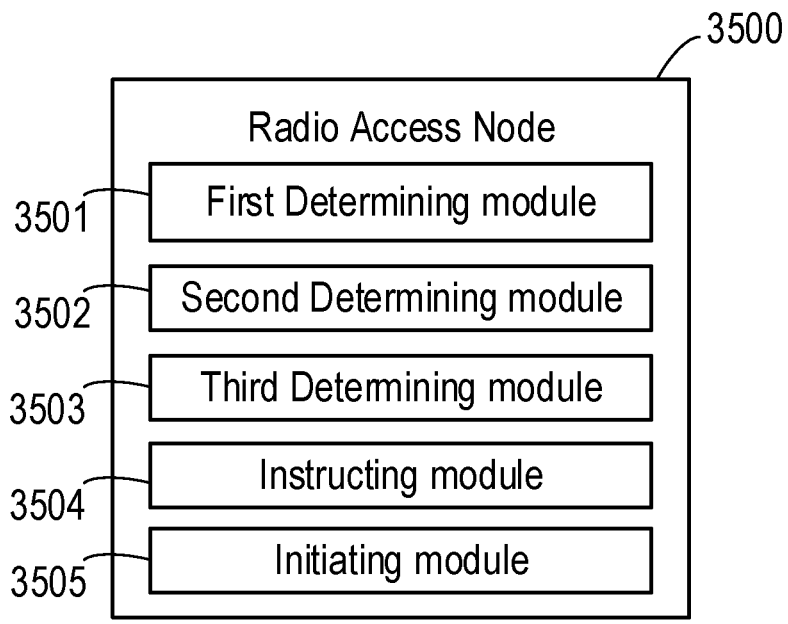
FIG. 35 illustrates a radio access node.

FIG. 35 shows a first radio access node 3500 in a radio access network further comprising a second radio access node. The first radio access node 3500 comprises: a first determining module 3501 for determining that a first user equipment, UE, that is served by the first radio access node should start relaying through a second UE; a second determining module 3502 for determining whether the second UE is served by the first radio access node; a third determining module 3503 for, in response to determining that the second UE is served not by the first radio access node but by the second radio access node, determining whether to initiate handover of the first UE to the second radio access node or to initiate handover of the second UE to the first radio access node such that the first and second UEs are served by the same radio access node; and an instructing module 3504 and an initiating module 3505 for either instructing the second radio access node to initiate handover of the second UE to the first radio access node; or initiating handover of the first UE to the second radio access node.

Figure 36:
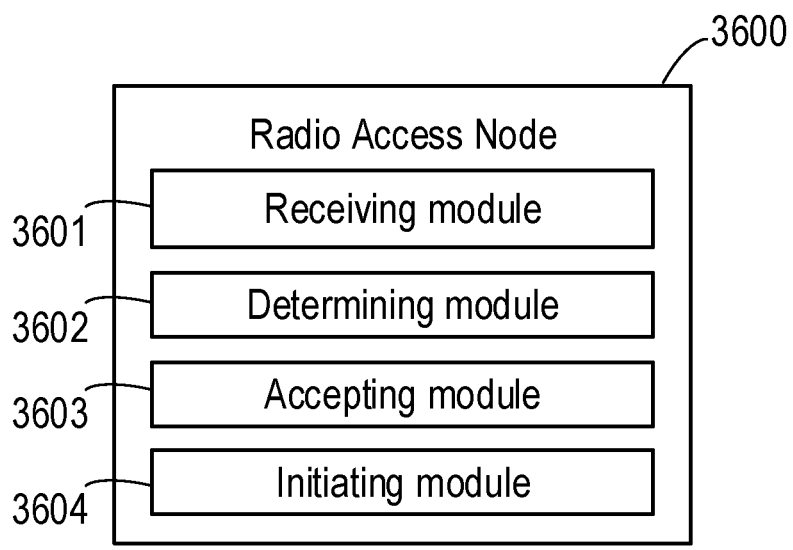
FIG. 36 illustrates a radio access node.

FIG. 36 shows a second radio access node 3600 in a radio access network further comprising a first radio access node. The second radio access node comprises: a receiving module 3601 for receiving a request to handover a first user equipment, UE, that is served by the first radio access node, to the second radio access node, and to activate relaying through a second UE that is served by the second radio access node; a determining module 3602 for determining whether it would be preferable to handover the first UE to the second radio access node or to initiate handover of the second UE to the first radio access node, such that the first and second UEs are served by the same radio access node; and an accepting module 3603 and an initiating module 3604 for either accepting the request to handover the first UE to the second radio access node; or initiating handover of the second UE to the first radio access node.

Figure 37:
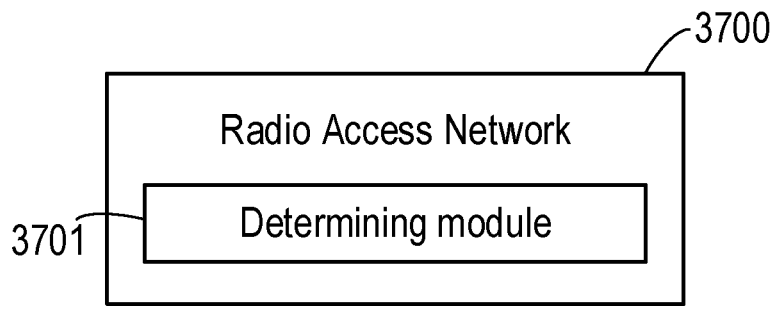
FIG. 37 illustrates a radio access network.

FIG. 37 shows a radio access network 3700 comprising: a determining module 3701 for, when a first user equipment, UE, is served by a first radio access node and is relaying through a second UE that is served by a second radio access node, wherein the second radio access node may be the same as or different from the first radio access node, and when it is determined that one of the first and second UEs should handover to a target radio access node, determining whether to initiate a handover of the other of the first and second UEs.

Figure 38:
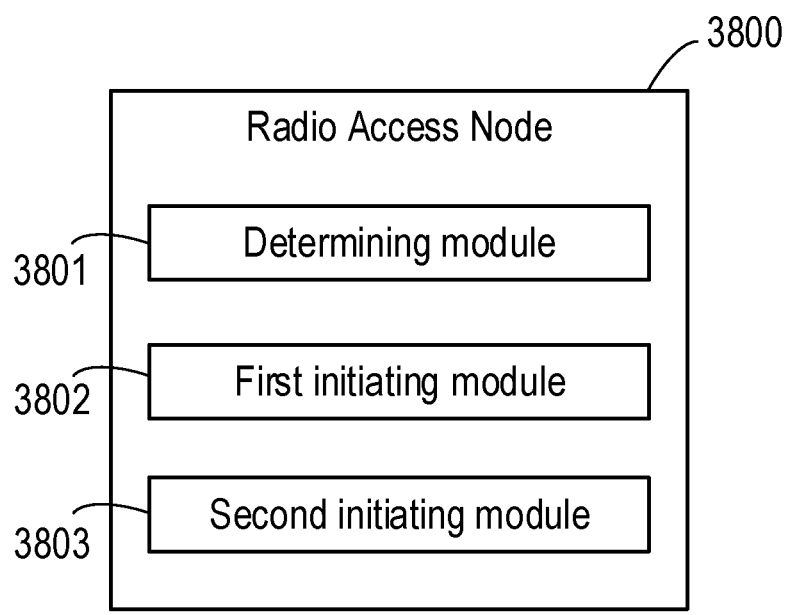
FIG. 38 illustrates a radio access node.

FIG. 38 shows a first radio access node 3800 comprising: a determining module 3801 for, when a first user equipment, UE, is served by the first radio access node and is relaying through a second UE that is also served by the first radio access node, determining that the first UE should relay through a third UE that is served by a second radio access node; a first initiating module 3802 for initiating a handover of the first UE to the second radio access node; and a second initiating module 3803 for initiating relaying from the first UE through a third UE.

Figure 39:
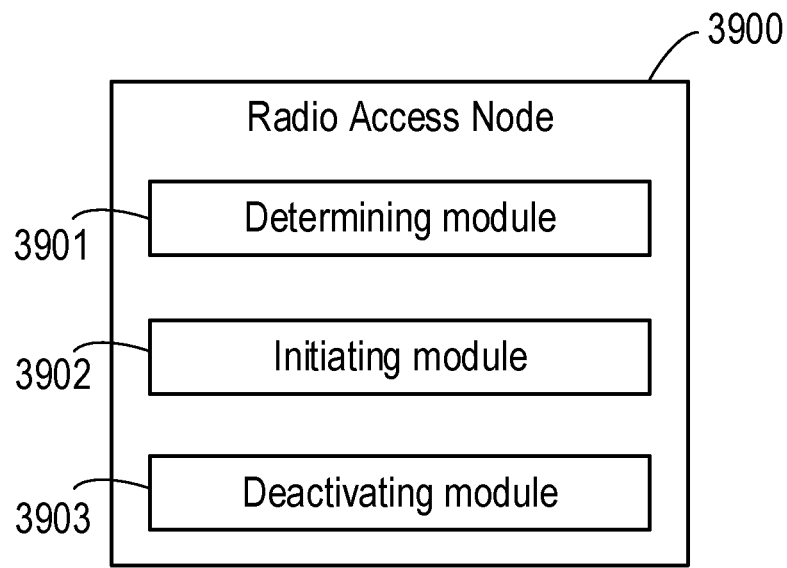
FIG. 39 illustrates a radio access node.

FIG. 39 shows a first radio access node 3900 comprising: a determining module 3901 for, when a first user equipment, UE, is served by the first radio access node and is relaying through a second UE that is also served by the first radio access node, determining that the first UE should be served by a second radio access node; an initiating module 3902 for initiating a handover of the first UE to the second radio access node; and a deactivating module 3903 for deactivating relaying from the first UE through the second UE.

Figure 40:
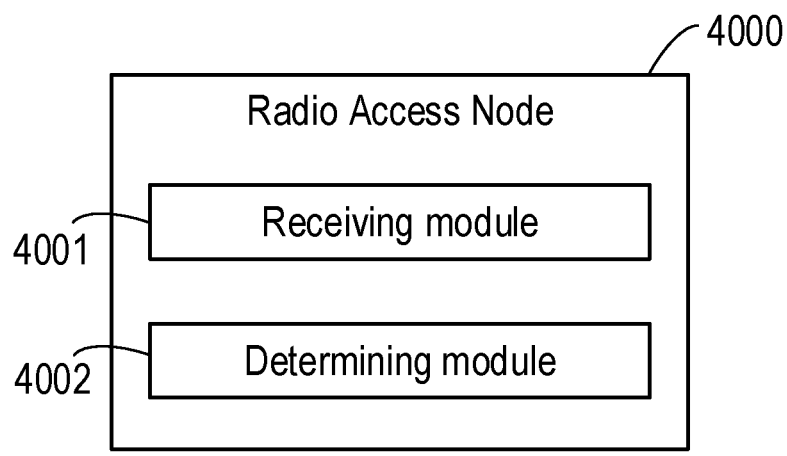
FIG. 40 illustrates a radio access node.

FIG. 40 shows a first radio access node comprising: a receiving module 4001 for, when a first user equipment, UE, is served by the first radio access node and is relaying through a second UE that is also served by the first radio access node, receiving a handover request from a second radio access node relating to a third UE, the handover request requesting that the third UE should start relaying through the second UE; and a determining module 4002 for determining whether to accept the handover request or to reject the handover request and to initiate a handover of the first UE and the second UE to the second radio access node.

Thus, there are described methods that deal with issues relating to handover in the case of UE-to-Network relaying.

The invention claimed is:

1. A method of operation of a radio access network comprising a first radio access node and a second radio access node, the method comprising:
determining that a first user equipment (UE) that is served by the first radio access node should start relaying communications with the radio access network through a second UE;
determining whether the second UE is served by the first radio access node; and
in response to determining that the second UE is served not by the first radio access node but by the second radio access node, initiating a handover of the second UE to the first radio access node.

2. The method of claim 1, wherein the step of initiating the handover of the second UE to the first radio access node is performed in the first radio access node.

3. The method of claim 2, further comprising, after the handover is complete, starting relaying through the second UE.

4. The method of claim 1, wherein the step of initiating the handover of the second UE to the first radio access node is performed in the second radio access node.

5. The method of claim 1, comprising determining whether the second UE is served by the first radio access node by:
receiving a notification from the first UE containing an identifier; and
using the identifier to identify the radio access node that is serving the second UE.

6. A radio access network, comprising a first radio access node and a second radio access node, the first radio access node and the second radio access node each comprising a processor and a memory, the memories containing instructions executable by the processors, such that the radio access network is operable to:
determine that a first user equipment (UE) that is served by the first radio access node should start relaying communications with the radio access network through a second UE;
determine whether the second UE is served by the first radio access node; and
in response to determining that the second UE is served not by the first radio access node but by the second radio access node, initiate a handover of the second UE to the first radio access node.

7. A method of operation of a first radio access node in a radio access network further comprising a second radio access node, the method comprising:
determining that a first user equipment (UE) that is served by the first radio access node should start relaying communications with the radio access network through a second UE;
determining whether the second UE is served by the first radio access node; and
in response to determining that the second UE is served not by the first radio access node but by the second radio access node, determining that handover of the second UE to the first radio access node should be initiated; and
instructing the second radio access node to initiate handover of the second UE to the first radio access node.

8. A first radio access node in a radio access network further comprising a second radio access node, the first radio access node comprising a processor and a memory, the memory containing instructions executable by the processor, such that the first radio access node is operable to:
determine that a first user equipment (UE) that is served by the first radio access node should start relaying communications with the radio access network through a second UE;
determine whether the second UE is served by the first radio access node; and
in response to determining that the second UE is served not by the first radio access node but by the second radio access node, determine that handover of the second UE to the first radio access node should be initiated; and
instruct the second radio access node to initiate handover of the second UE to the first radio access node.

* * * * *